(12) United States Patent
Zhao et al.

(10) Patent No.: US 9,949,314 B2
(45) Date of Patent: Apr. 17, 2018

(54) SUPPORT BLACKLISTING DEVICES ON WLAN ACCESS

(71) Applicant: QUALCOMM Incorporated, San Diego, CA (US)

(72) Inventors: Suli Zhao, San Diego, CA (US); Vinay Paradkar, Broomfield, CO (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 14/860,369

(22) Filed: Sep. 21, 2015

(65) Prior Publication Data

US 2016/0088676 A1 Mar. 24, 2016

Related U.S. Application Data

(60) Provisional application No. 62/054,356, filed on Sep. 23, 2014.

(51) Int. Cl.
| | |
|---|---|
| *H04W 76/04* | (2009.01) |
| *H04W 76/02* | (2009.01) |
| *H04L 29/06* | (2006.01) |
| *H04W 12/08* | (2009.01) |
| *H04W 12/12* | (2009.01) |

(Continued)

(52) U.S. Cl.
CPC ....... *H04W 76/043* (2013.01); *H04L 63/0876* (2013.01); *H04L 63/101* (2013.01); *H04W 12/08* (2013.01); *H04W 12/12* (2013.01); *H04W 76/022* (2013.01); *H04W 12/06* (2013.01); *H04W 48/02* (2013.01); *H04W 84/12* (2013.01); *H04W 88/06* (2013.01)

(58) Field of Classification Search
CPC . H04W 76/043; H04W 12/08; H04W 76/022; H04W 12/06; H04W 12/12; H04W 48/02; H04W 84/12; H04W 88/06; H04L 63/0876; H04L 63/101
See application file for complete search history.

(56) References Cited

U.S. PATENT DOCUMENTS 7,496,754 B2 2/2009 Liu et al.
8,914,853 B2 12/2014 Chen et al.
(Continued)

FOREIGN PATENT DOCUMENTS

EP 2276279 A1 1/2011
WO 2010013914 A2 2/2010
(Continued)

OTHER PUBLICATIONS

International Search Report and Written Opinion—PCT/US2015/051532—ISA/EPO—Dec. 15, 2015.

*Primary Examiner* — Duc C Ho
(74) *Attorney, Agent, or Firm* — Arent Fox LLP

(57) ABSTRACT

A method, an apparatus, and a computer program product for wireless communication are provided. The apparatus may be a core network entity. The apparatus sends a request for a device identifier of a UE to the UE. The apparatus receives a response message including the device identifier of the UE from the UE. The apparatus determines to maintain, establish, terminate or prevent a connection with the UE through WLAN access based on the device identifier of the UE.

84 Claims, 20 Drawing Sheets

(51) Int. Cl.
    *H04W 12/06*    (2009.01)
    *H04W 84/12*    (2009.01)
    *H04W 88/06*    (2009.01)
    *H04W 48/02*    (2009.01)

(56) References Cited

U.S. PATENT DOCUMENTS

| | | |
|---|---|---|
| 2007/0173251 A1 | 7/2007 | Vikberg et al. |
| 2010/0222058 A1* | 9/2010 | Pudney ............... H04W 36/24 |
| | | 455/435.2 |
| 2010/0238990 A1* | 9/2010 | Rao .................... H04W 24/08 |
| | | 375/228 |
| 2010/0313020 A1* | 12/2010 | Montemurro ....... H04L 63/0892 |
| | | 713/168 |
| 2012/0221600 A1* | 8/2012 | Yan ..................... G06Q 30/02 |
| | | 707/769 |
| 2013/0028420 A1* | 1/2013 | Vikberg ............... H04W 12/02 |
| | | 380/270 |
| 2013/0097674 A1 | 4/2013 | Jindal et al. |
| 2013/0254395 A1 | 9/2013 | Chen et al. |
| 2014/0086177 A1* | 3/2014 | Adjakple ............. H04W 12/08 |
| | | 370/329 |
| 2015/0365403 A1* | 12/2015 | Counterman ....... H04L 63/0876 |
| | | 726/9 |

FOREIGN PATENT DOCUMENTS

| | | |
|---|---|---|
| WO | 2013109619 A1 | 7/2013 |
| WO | 2014117811 A1 | 8/2014 |

\* cited by examiner

US 9,949,314 B2

SUPPORT BLACKLISTING DEVICES ON WLAN ACCESS

CROSS-REFERENCE TO RELATED APPLICATION(S)

This application claims the benefit of U.S. Provisional Application Ser. No. 62/054,356, entitled "SUPPORT BLACKLISTING DEVICES ON WLAN ACCESS" and filed on Sep. 23, 2014, which is expressly incorporated by reference herein in its entirety.

BACKGROUND

Field

The present disclosure relates generally to communication systems, and more particularly, to device communication to a core network via WLAN access.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a core network entity. The apparatus sends a request for a device identifier of a user equipment (UE) to the UE. The apparatus receives a response message including the device identifier of the UE from the UE. The apparatus determines to maintain, establish, terminate or prevent a connection with the UE through wireless local area network (WLAN) access based on the device identifier of the UE included in the response message.

In an aspect of the disclosure, a method, a computer program product, and an apparatus are provided. The apparatus may be a core network entity. The apparatus receives a notification about a device identifier of a UE from a second core network entity, wherein the notification about the device identifier is generated based on the device identifier that was received via a cellular access procedure. The apparatus determines to maintain, establish, terminate or prevent a connection with the UE through WLAN access based on the notification about the device identifier of the UE.

In an aspect of the disclosure, a method, a computer program product, and an apparatus are provided. The apparatus may be a UE. The apparatus receives a request for a device identifier of the UE from at least one of a first core network entity or a second core network entity. The apparatus sends a response message including the device identifier of the UE to at least one of the first core network entity or the second core network entity, where at least one of the first core network entity or the second core network entity is configured to determine to maintain, establish, terminate or prevent a connection with the UE through wireless local area network (WLAN) access based on the device identifier of the UE included in the response message.

In an aspect of the disclosure, a method, a computer program product, and an apparatus are provided. The apparatus may be a UE. The apparatus sends a authentication request including a device identifier of the apparatus to a core network entity. The apparatus receives a authentication response including an indication that indicates whether the device identifier of the apparatus is blacklisted. The apparatus determines to maintain, establish, terminate or prevent a connection with a core network through wireless local area network (WLAN) access based on the indication.

DETAILED DESCRIPTION

Figure 1:
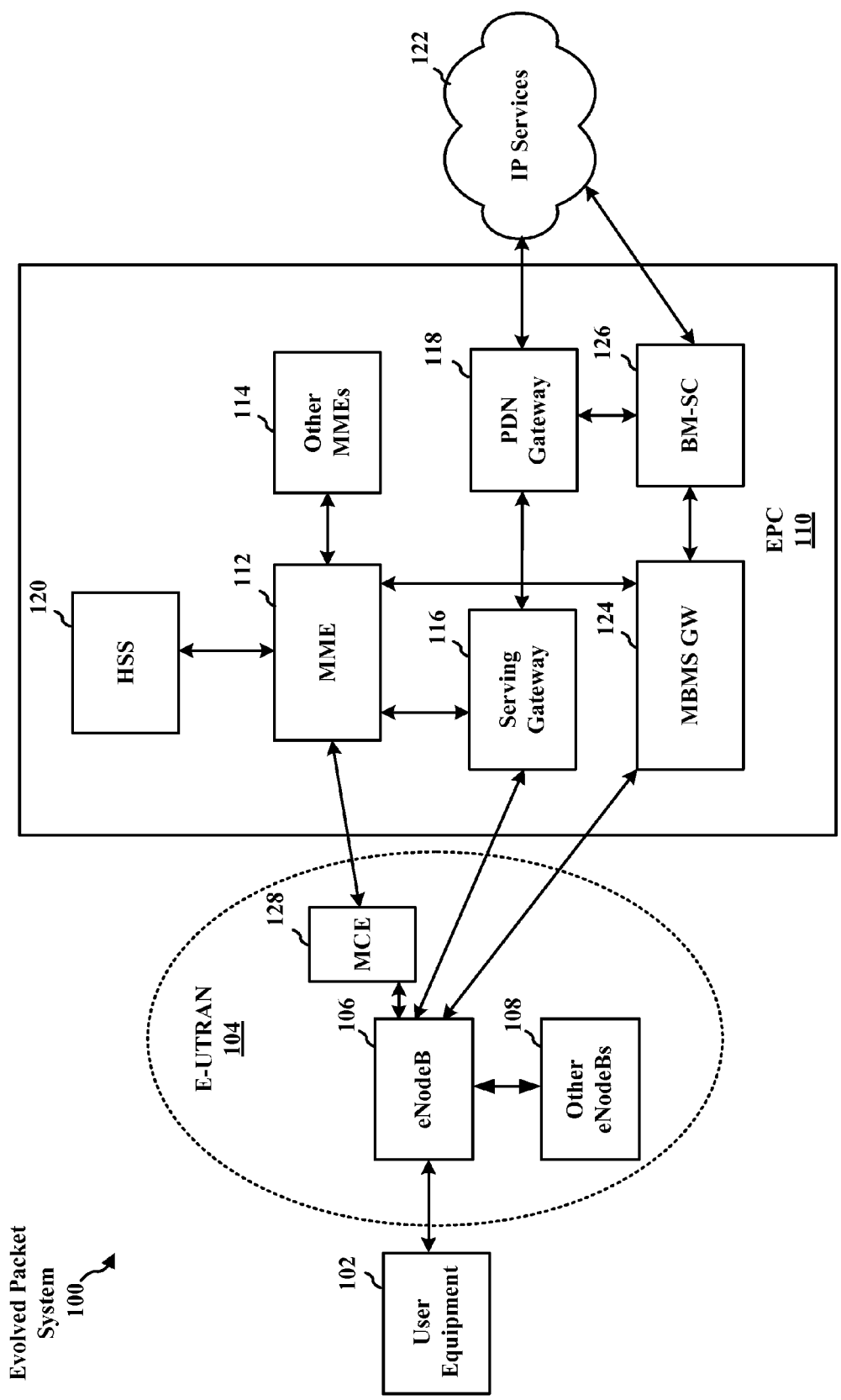
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
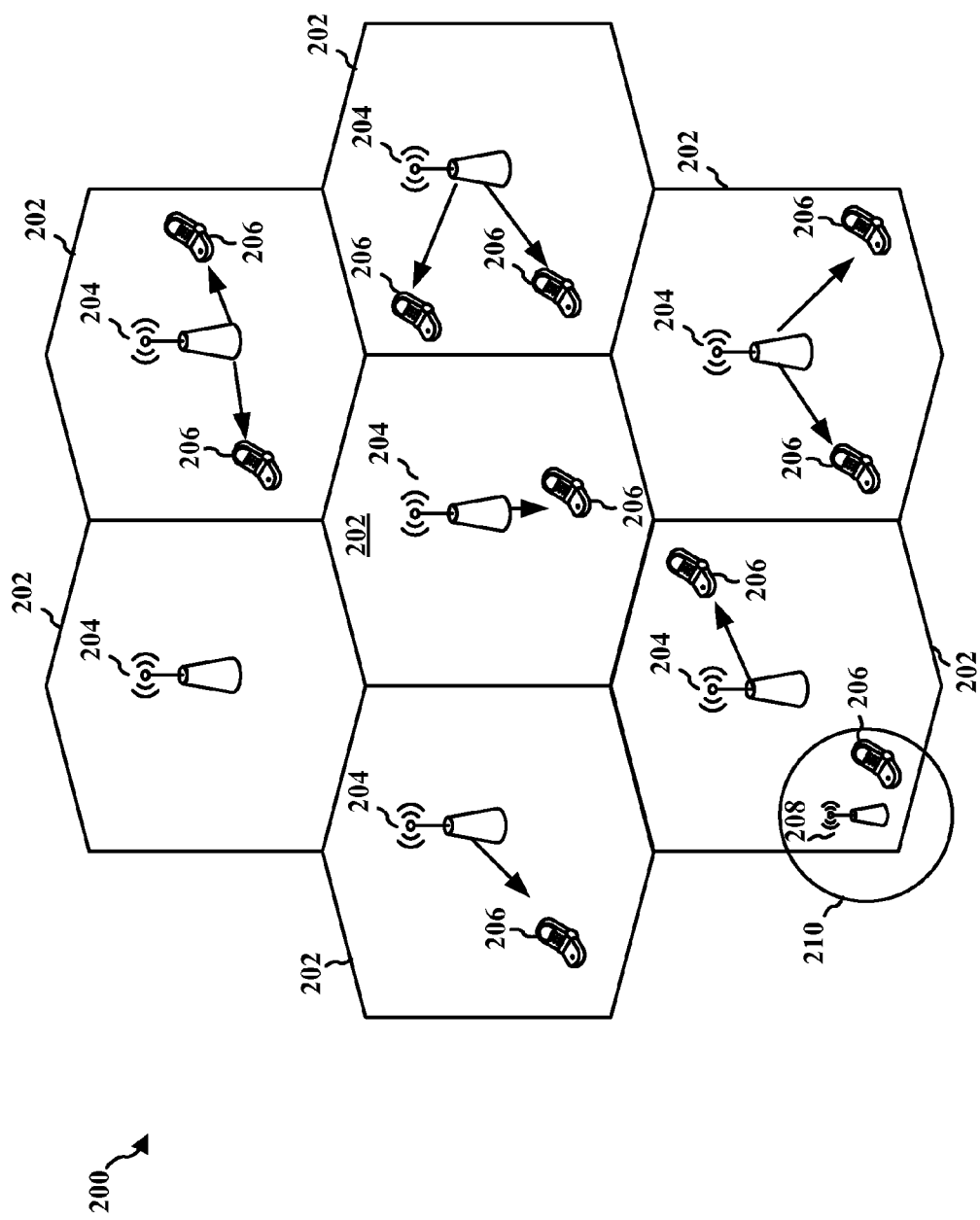
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
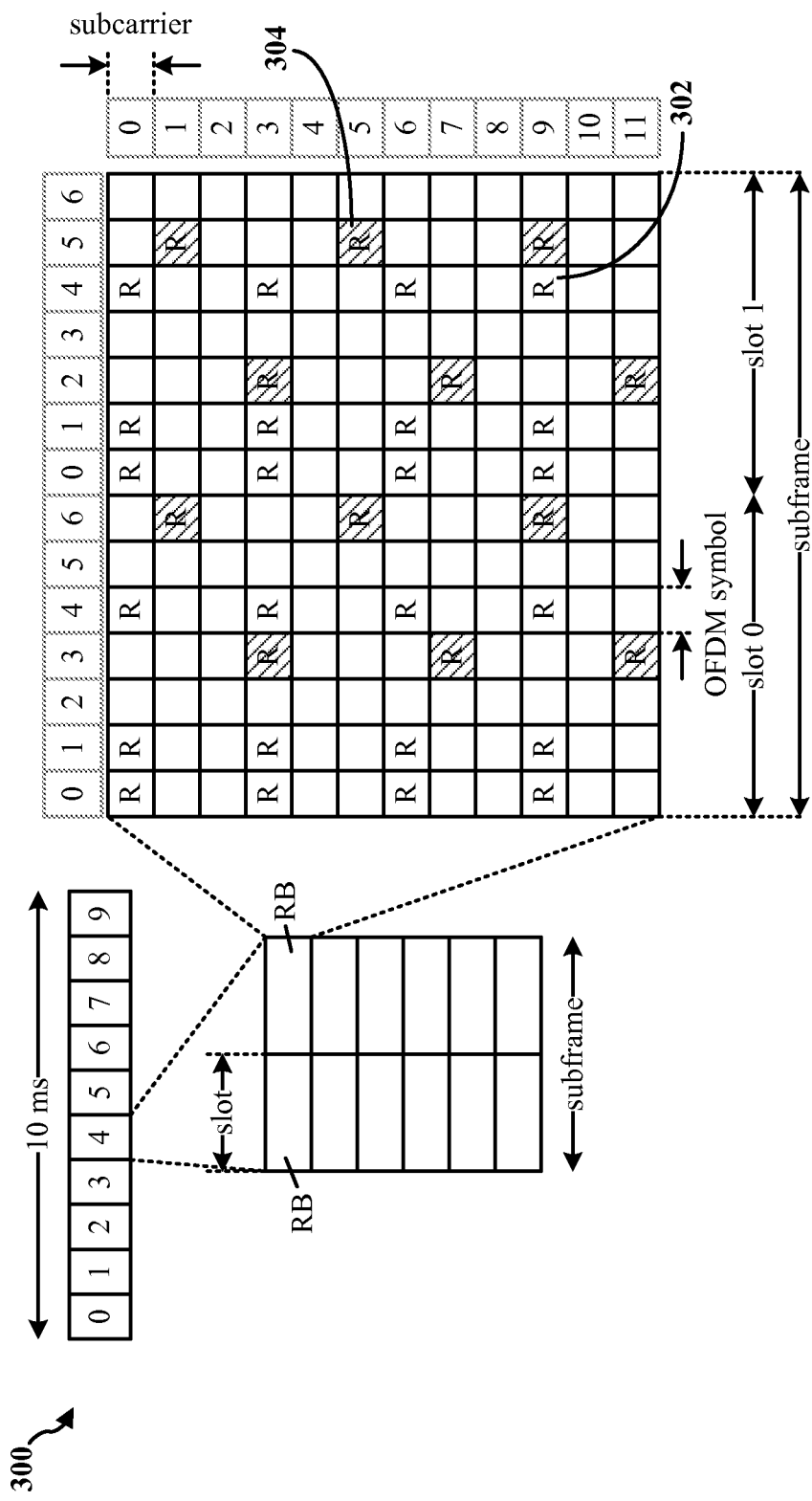
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
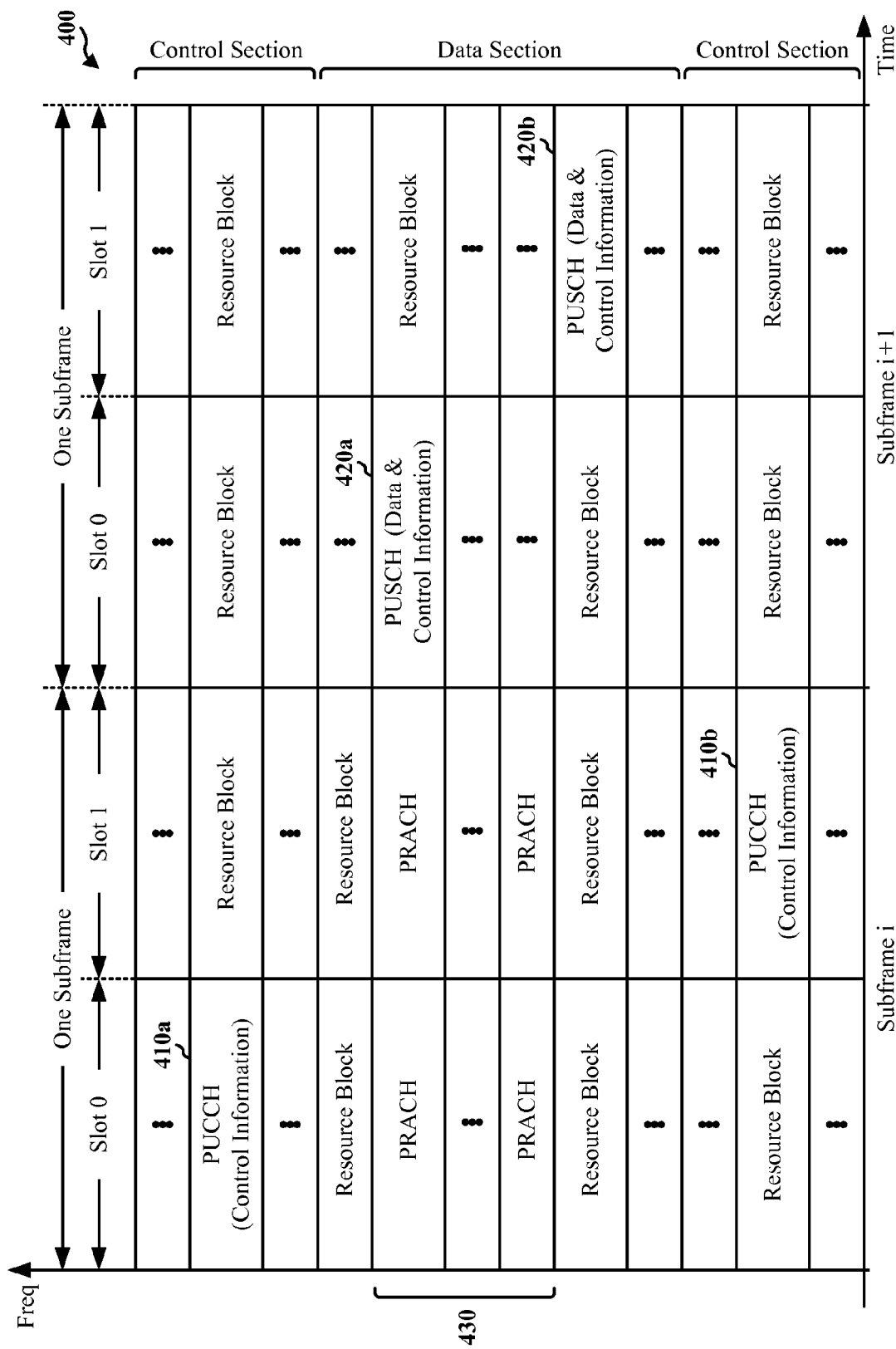
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
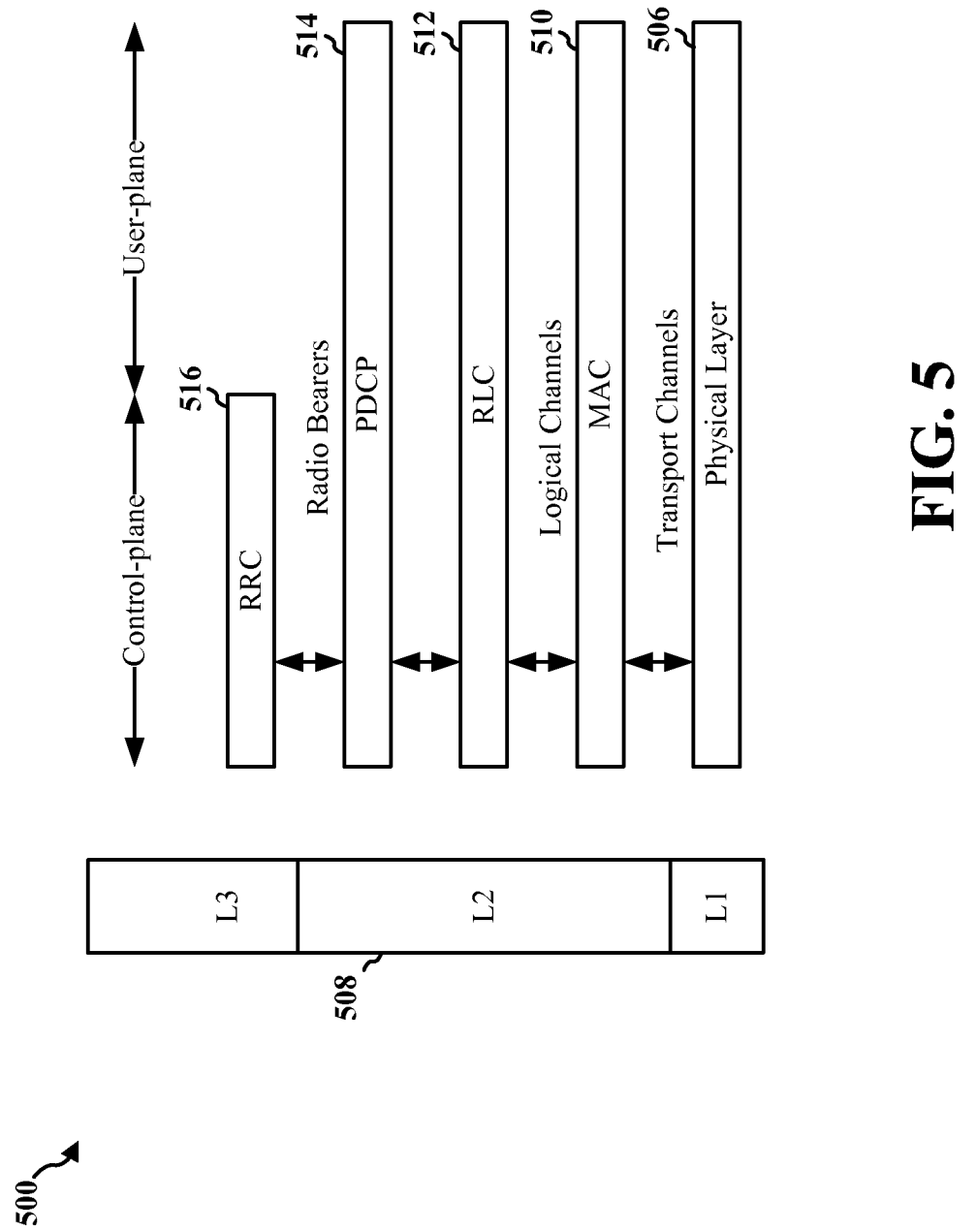
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
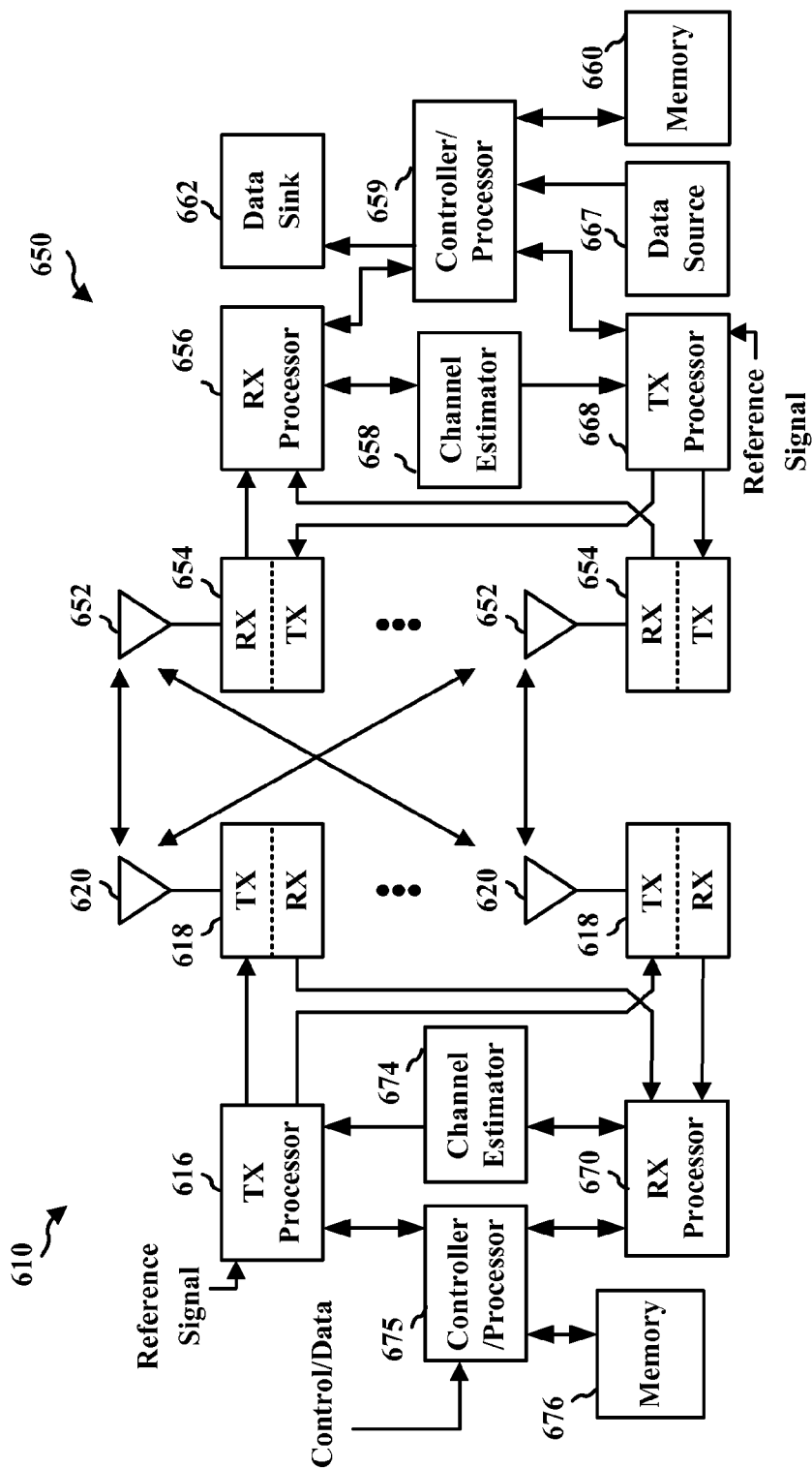
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub carrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

A local area network such as a wireless local area network (WLAN) may be utilized in addition to the LTE connection (e.g., via the E-UTRAN 104) or instead of the LTE connection to connect to a core network (e.g., the EPC 110). Use of the WLAN in addition to the LTE connection may expand the network capacity and radio capability to access packet data through the core network. In an aspect, the WLAN connection and the LTE connection may utilize a common PDN gateway. Thus, when the UE switches between the LTE connection and the WLAN connection to communicate with the core network, the UE may maintain the same IP address and thus the communication between the UE and the core network may continue without interruption during the switch.

Figure 7:
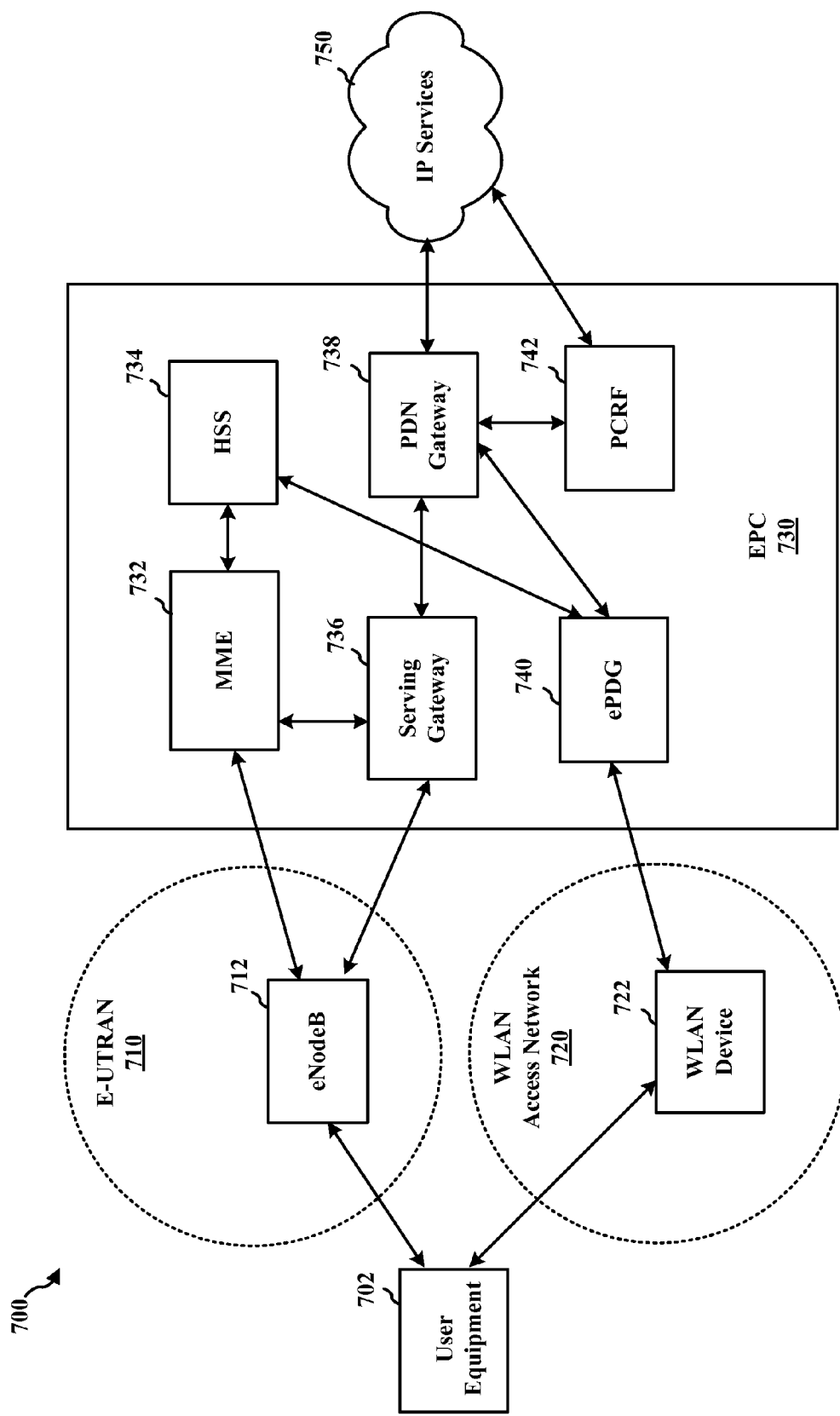
FIG. 7 is an example diagram illustrating an example network architecture for a use of an LTE connection and a WLAN connection to receive data through a core network.

FIG. 7 is an example diagram 700 illustrating an example network architecture for a use of an LTE connection and a WLAN connection to receive data through a core network. The example network architecture of the example diagram 700 includes at least one UE 702, an E-UTRAN 710, a WLAN access network (WLAN AN) 720, an EPC 730, and an Operator's IP Services 750. The UE 702 may be equivalent to the UE 650 or the UE 102. The network architecture can interconnect with other access networks, but for simplicity those entities/interfaces are not shown. As shown, the network architecture provides packet-switched services, however, as those skilled in the art will readily appreciate, the various concepts presented throughout this disclosure may be extended to networks providing circuit-switched services.

The E-UTRAN 710 includes an eNB 712. The eNB may be equivalent to the eNB 106 or the eNB 610. The eNB 712 provides user and control planes protocol terminations toward the UE 702. The eNB 712 may also be referred to as a base station, a Node B, an access point, a base transceiver station, a radio base station, a radio transceiver, a transceiver function, a BSS, an ESS, or some other suitable terminology. The eNB 712 provides an access point to the EPC 730 for the UE 702. The E-UTRAN may further include an MCE (not shown) as a part of the eNB 712 or as a separate entity. The WLAN AN 720 includes a WLAN device 722 providing a WLAN network that the UE 702 may access. The WLAN device 722 provides an access point to the EPC 730 for the UE 702.

The eNB 712 is connected to the EPC 730. The EPC 730 may include an MME 732, an HSS 734, a Serving Gateway 736, and a PDN Gateway 738. The MME 732 is the control node that processes the signaling between the UE 702 and the EPC 730. Generally, the MME 732 provides bearer and connection management. User IP packets are transferred through the Serving Gateway 736, which itself is connected to the PDN Gateway 738. The PDN Gateway 738 provides UE IP address allocation as well as other functions. The PDN Gateway 738 is connected to the IP Services 750. The IP Services 750 may include the Internet, an intranet, an IMS, a PSS, and/or other IP services. The WLAN device 722 is connected to an evolved packet data gateway (ePDG) 740. The ePDG provides a route between the WLAN AN 720 and the PDN gateway 738. The PDN gateway 738 may be connected to a policy and charging resource function (PCRF) 742. The PCRF 742 is a node that makes policy and charging decisions based on input from different sources, including mobile operator configuration, user subscription information, services information, etc. The HSS 734 is connected to the MME 732 and the ePDG 740. The HSS 734 is a central database that contains user-related and subscription-related information, and may be used for mobility management, call and session establishment support, user authentication and access authorization.

In order to obtain services through the WLAN access network, the UE may perform access authentication with an HSS and/or an authentication, authorization, and accounting (AAA) function (HSS/AAA) based on international mobile subscriber identity (IMSI) that is used to identify the user of a cellular network. A cellular carrier may request the UE to provide a device identifier (e.g. international mobile station equipment identity (IMEI)) of the UE to the network. The cellular carrier may selectively provide a service to a UE (e.g., the UE 102, the UE 650, the UE 702) based on the device identifier of the UE. The cellular carrier may determine whether to provide a service to the UE based on the device identifier of the UE. For example, if the UE is stolen, a user of the UE may report to the UE's cellular carrier that the UE is stolen. Subsequently, the cellular carrier blacklists a device identifier for the stolen UE. If a device identifier of a UE is on a black list (e.g., blacklisted), then the cellular carrier does not provide a service to the UE associated with the blacklisted device identifier. In particular, when the UE connects to the core network (e.g., EPC 730) via LTE, the core network sends the UE a request for the device identifier of the UE. In response, the UE sends the device identifier to the core network. If the core network determines that the device identifier is blacklisted, the core network does not provide a service to the UE associated with the blacklisted device identifier. However, such procedure involving a black list of one or more device identifiers has not been implemented for a case where the UE connects to the core network via the WLAN access network. Thus, currently, in a case where the UE connects to the core network via the WLAN, even if a device identifier is black listed, the core network does not prevent from providing a service to the UE via the WLAN. Therefore, a procedure is desired to prevent the core network from providing a service to the UE associated with a blacklisted device identifier when the UE is connected to the core network via the WLAN.

Figure 8:
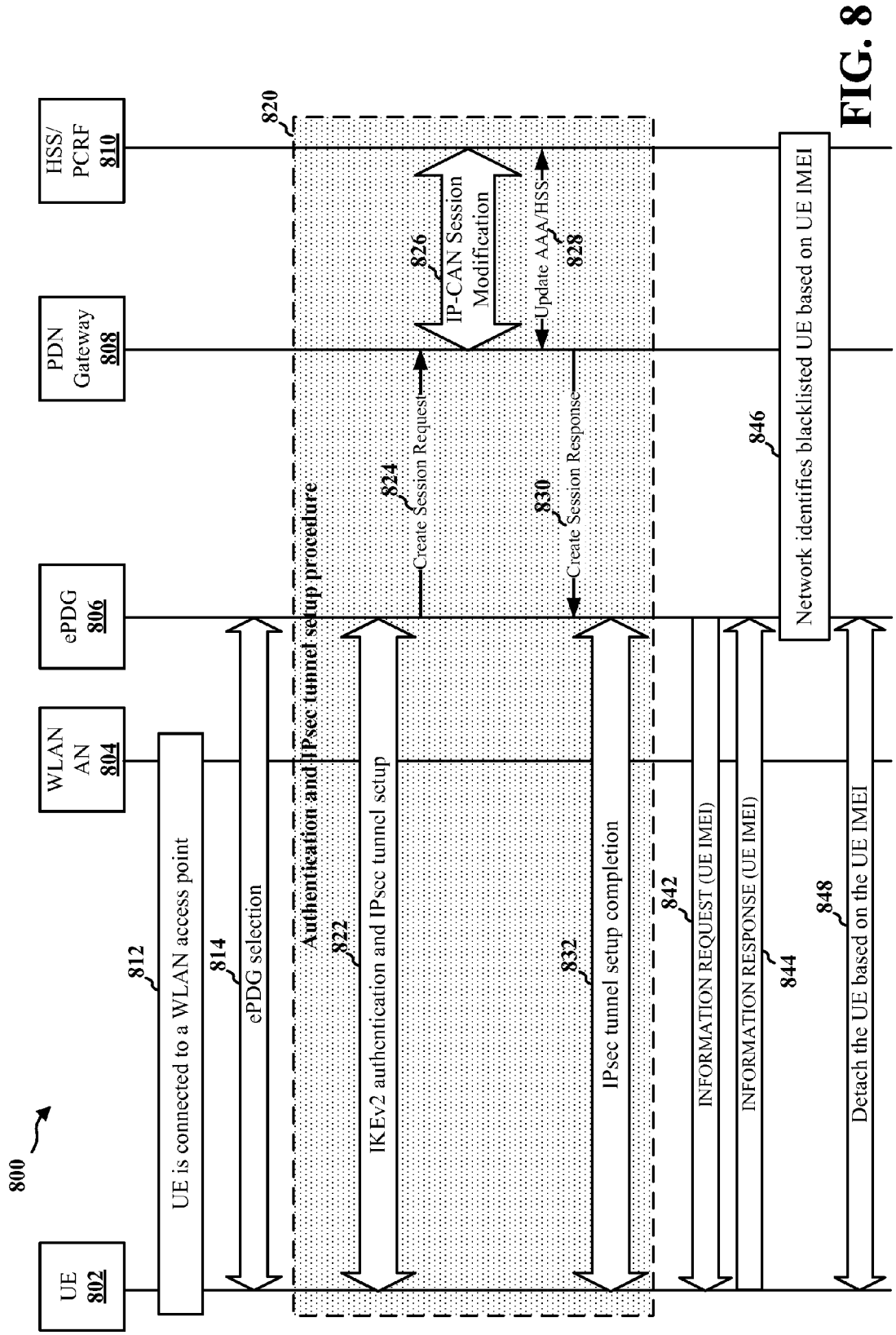
FIG. 8 is an example flow diagram illustrating a procedure to determine whether to maintain UE's connection to a core network via a WLAN access network, according to a first aspect of the disclosure.

FIG. 8 is an example flow diagram 800 illustrating a procedure to determine whether to maintain UE's connection to a core network via a WLAN access network, according to a first aspect of the disclosure. The example flow diagram 800 involves a UE 802, a WLAN AN 804, an ePDG 806, a PDN gateway 808, and an HSS/PCRF 810. At 812, the UE 802 connects to the WLAN AN 804 via a WLAN access point, and thus the UE 802 is assigned a local IP address. At 814, after connecting to the WLAN AN 804, the UE 802 performs an ePDG selection procedure via the WLAN AN 804 to select the ePDG 806. In particular, at 814, the UE 802 determines to access the carrier's core network via WLAN, and thus performs an ePDG discovery procedure to find an ePDG (e.g., the ePDG 806) to select. At 820, steps for authentication and IP security (IPsec) tunnel setup procedure are performed to establish a secure tunnel between the UE 802 and the ePDG 806, such that the ePDG will be able to set up a tunnel with the PDN gateway 808. In particular, at 822, the UE 802 initiates an authentication, such as internet key exchange version 2 (IKEv2) authentication, and an IPSec tunnel setup with the ePDG 806 via the WLAN AN 804. At 824, the ePDG 806 sends a request to create a session to the PDN gateway 808. In response, at 826, the PDN gateway 808 communicates with the HSS/PCRF 810 to modify an IP connectivity access network (IP-CAN) session, according to the session create request from the ePDG 806, in order to provide IP connectivity to the UE 802. At 828, the PDN gateway 808 communicates with the HSS/PCRF 810 to update an AAA function and an appropriate HSS address. At 830, the PDN gateway 830 sends the ePDG 806 a response to the create session request, indicating that the IP-CAN session has been created/modified. At 832, the UE 802 communicates with the ePDG 806 via the WLAN AN 804 to complete the IPSec tunnel setup to provide a secure tunnel between the UE 802 and the ePDG 806, and the ePDG 806 establishes a tunnel with the PDN gateway 830. Thus, the UE 802 may communicate with the PDN gateway 808 via the WLAN AN 804 and the ePDG 806, through the secure tunnel between the UE 802 and the ePDG 806, and the tunnel between the ePDG 806 and the PDN gateway 830.

After the authentication and IPsec tunnel setup procedure, at 842, the ePDG 806 sends the UE 802 an information request to request for the UE's IMEI, via the WLAN AN 804. The IMEI is a device identifier that is specific to the UE. In response, at 844, the UE 802 sends the information response including the IMEI of the UE 802 to the ePDG 806 via the WLAN AN 804. It is noted that the information request and/or the information response are communicated between the UE 802 and the ePDG 806 using the security association (such as the IPsec tunnel between the UE 802 and the ePDG 806). Thus, the IMEI carried in the information response payload is securely protected by a security algorithm of the security association. It is further noted that the UE 802 may provide the IMEI to the core network via the WLAN AN 804, without relying on the LTE connection.

Subsequently, at 846, core network entities including the ePDG 806, the PDN gateway 830, the HSS/PCRF 810, etc. determine whether the IMEI of the UE 802 is blacklisted. When the core network entities determine that the IMEI of the UE 802 is blacklisted, at 848, the core network entities (e.g., the ePDG 806) detach the UE 802 such that the UE 802 can no longer communicate with the core network via the WLAN AN 804. In such a case, for example, the core network entities (e.g., the ePDG 806) may send to the UE 802 a detachment indication indicating to disable a connection between the UE 802 and the core network entities, and the UE may subsequently refrain from requesting or maintaining the connection between the UE 802 and the core network entities upon receiving the detachment indication. On the other hand, when the core network entities determine that the IMEI of the UE 802 is not blacklisted, the core network entities (e.g., the ePDG 806) maintain the connection between the UE 802 and the core network via the WLAN AN 804.

Figure 9:
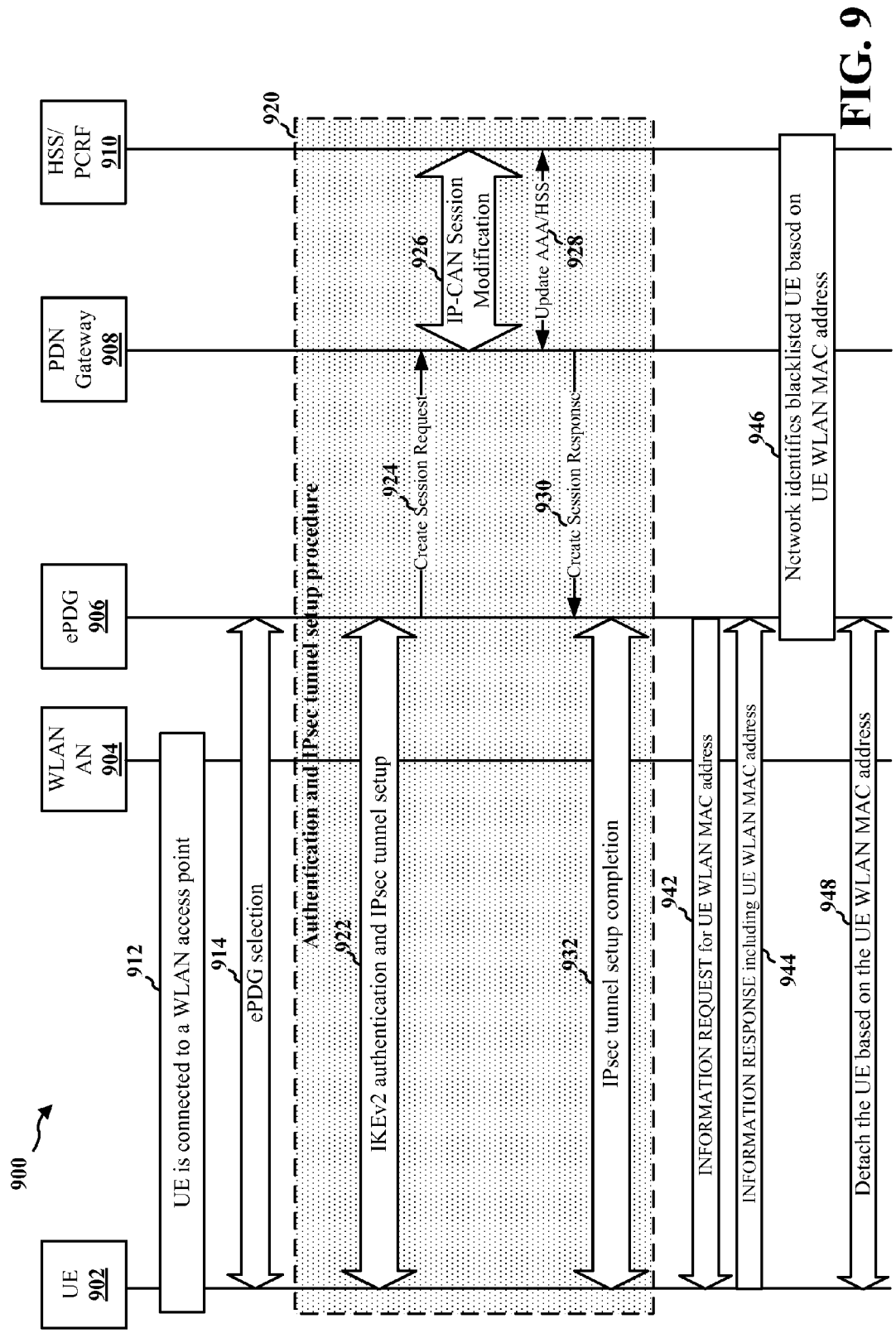
FIG. 9 is an example flow diagram illustrating a procedure to determine whether to maintain UE's connection to a core network via a WLAN access network, according to a second aspect of the disclosure.

FIG. 9 is an example flow diagram 900 illustrating a procedure to determine whether to maintain UE's connection to a core network via a WLAN access network, according to a second aspect of the disclosure. The example flow diagram involves a UE 902, a WLAN AN 904, an ePDG 906, a PDN gateway 908, and an HSS/PCRF 910, which may be equivalent to the UE 802, the WLAN AN 804, the ePDG 806, the PDN gateway 808, and the HSS/PCRF 810, respectively. Steps 912 through 932 are equivalent to steps 812-832, and thus explanations of steps 912 through 932 are omitted for brevity.

After the authentication and IPsec tunnel setup procedure, at 942, the ePDG 906 sends the UE 902 an informational request to request for the UE WLAN MAC address, via the WLAN AN 904. The WLAN MAC address is a device identifier that is specific to the UE. In response, at 944, the UE 902 sends an informational response including the UE WLAN MAC address of the UE 902 to the ePDG 906 via the WLAN AN 904. It is noted that the information request and/or the information response are communicated between the UE 902 and the ePDG 906 using the security association (such as the IPsec tunnel between the UE 902 and the ePDG 906) established during the authentication and IPsec tunnel setup procedure 920. Thus, the UE WLAN MAC address carried in the response payload sent to the ePDG 906 may be securely protected by a security algorithm of the security association. It is further noted that the UE 802 may provide the UE WLAN MAC to the core network via the WLAN AN 804, without relying on the LTE connection. Subsequently, at 946, core network entities including the ePDG 906, the PDN gateway 930, the HSS/PCRF 910, etc. determine whether the UE WLAN MAC address of the UE 902 is blacklisted. When the core network entities determine that the UE WLAN MAC address of the UE 902 is blacklisted, at 948, the core network entities (e.g., the ePDG 906) detach the UE 902 such that the UE 902 can no longer connect to the core network via the WLAN AN 904. In such a case, for example, the core network entities (e.g., the ePDG 906) may send to the UE 902 a detachment indication indicating to disable a connection between the UE 902 and the core network entities, and the UE may subsequently refrain from requesting or maintaining the connection between the UE 902 and the core network entities upon receiving the detachment indication. On the other hand, when the core network entities determine that the UE WLAN MAC address of the UE 802 is not blacklisted, the core network entities (e.g., the ePDG 806) maintain the connection between the UE 802 and the core network via the WLAN AN 804.

Figure 10:
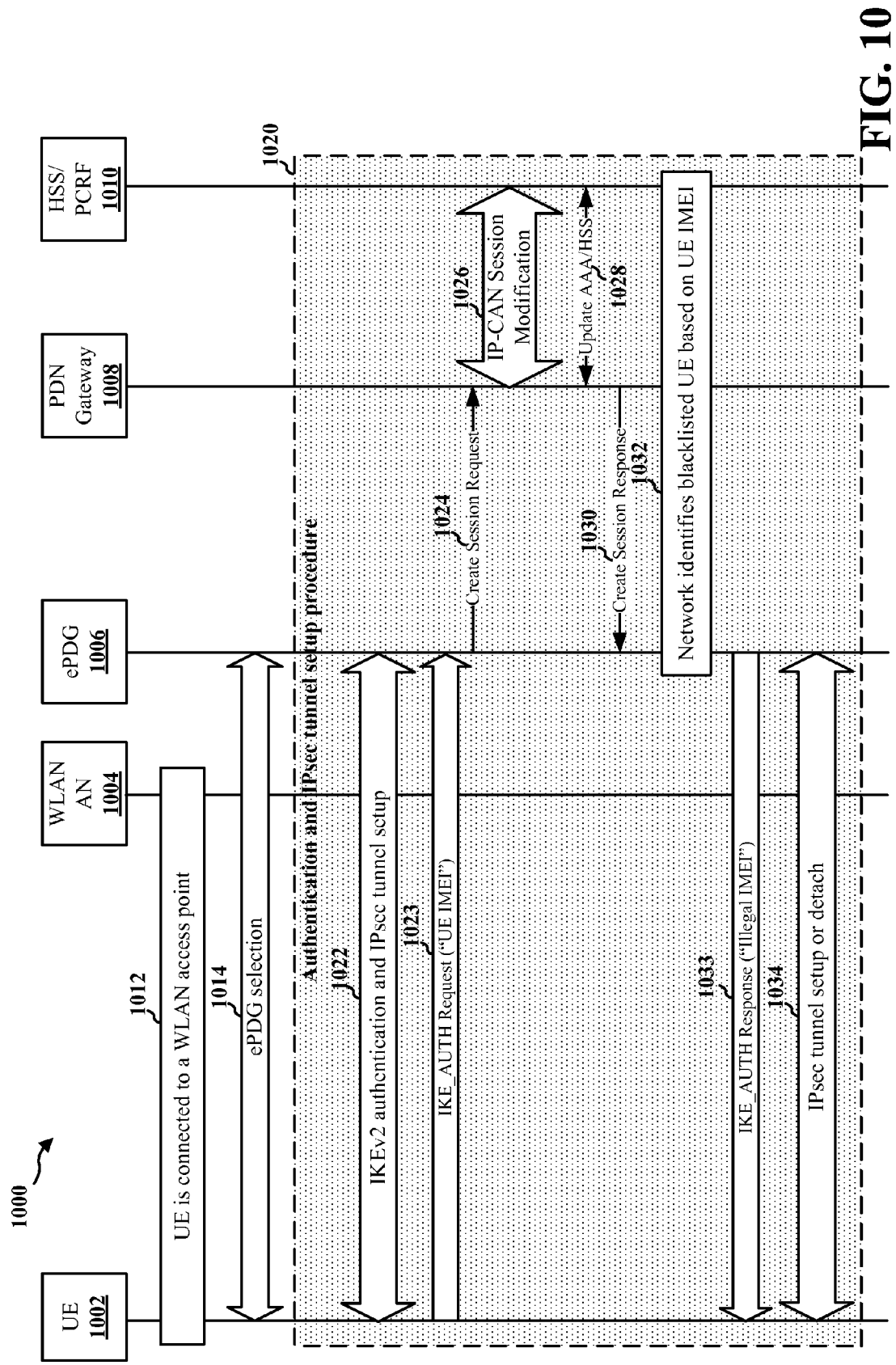
FIG. 10 is an example flow diagram illustrating a procedure to determine whether to maintain UE's connection to a core network via a WLAN access network, according to a third aspect of the disclosure.

FIG. 10 is an example flow diagram 1000 illustrating a procedure to determine whether to maintain UE's connection to a core network via a WLAN access network, according to a third aspect of the disclosure. The example flow diagram 1000 involves a UE 1002, a WLAN AN 1004, an ePDG 1006, a PDN gateway 1008, and an HSS/PCRF 1010. At 1012, the UE 1002 connects to the WLAN AN 1004 via a WLAN access point, and thus the UE 1002 is assigned a local IP address. At 1014, after connecting to the WLAN AN 1004, the UE 1002 performs an ePDG selection procedure via the WLAN AN 1004 to select the ePDG 1006. In particular, at 1014, the UE 1002 determines to access the carrier's core network via WLAN, and thus performs an ePDG discovery procedure to find an ePDG (e.g., the ePDG 1006) to select.

At 1020, steps for authentication and IPsec tunnel setup procedure are performed to establish a secure tunnel between the UE 1002 and the ePDG 1006, such that the ePDG will be able to set up a tunnel with the PDN gateway 1008. In particular, at 1022, the UE 1002 initiates an authentication, such as IKEv2 authentication, and an IPSec tunnel setup with the ePDG 1006 via the WLAN AN 1004. During the authentication and IPsec tunnel setup procedure, at 1023, the UE 1002 sends the ePDG 1006 an authentication request (e.g., internet key exchange (IKE) authentication request), via the WLAN AN 1004, where the authentication request includes the UE's IMEI. The IMEI is a device identifier that is specific to the UE 1002. It is further noted that the UE 1102 may provide the IMEI to the core network via the WLAN AN 1104, without relying on the LTE connection. At 1024, the ePDG 1006 sends a request to create a session to the PDN gateway 1008. In response, at 1026, the PDN gateway 1008 communicates with the HSS/PCRF 1010 to modify an IP-CAN session, according to the session create request from the ePDG 1006, in order to provide IP connectivity to the UE 1002. At 1028, the PDN gateway 1008 communicates with the HSS/PCRF 1010 to update an AAA function and an appropriate HSS address. At 1030, the PDN gateway 1030 sends the ePDG 1006 a response to the create session request, indicating that the IP-CAN session has been created/modified. At 1032, core network entities including the ePDG 1006, the PDN gateway 1030, the HSS/PCRF 1010, etc. determine whether the IMEI of the UE 1002 is blacklisted. At 1033, the ePDG 1106 sends an authentication response to the UE 1002 via the WLAN AN 1004, where the authentication response includes information about whether the UE's IMEI included in the authentication request is blacklisted, based on the determination at 1032. It is noted that, according to another aspect, steps 1023, 1032, and 1033 may take place in sequence and may take place any time between step 1022 and step 1034.

At 1034, if the authentication response indicates that the IMEI of the UE 1002 is blacklisted, the UE 1002 detaches from the core network (e.g., by disconnecting from the ePDG 1006), and stops the IPSec tunnel setup. In such a case, for example, the core network entities (e.g., the ePDG 1006) may send to the UE 1002 a detachment indication indicating to disable a connection between the UE 1002 and the core network entities, and the UE may subsequently refrain from requesting or maintaining the connection between the UE 1002 and the core network entities upon receiving the detachment indication. At 1034, if the authentication response does not indicate that the IMEI of the UE 1002 is blacklisted, the UE 1002 communicates with the ePDG 1006 via the WLAN AN 1004 to complete the IPSec tunnel setup to provide a secure tunnel between the UE 1002 and the ePDG 1006, and the ePDG 1006 establishes a tunnel with the PDN gateway 1030.

Figure 11:
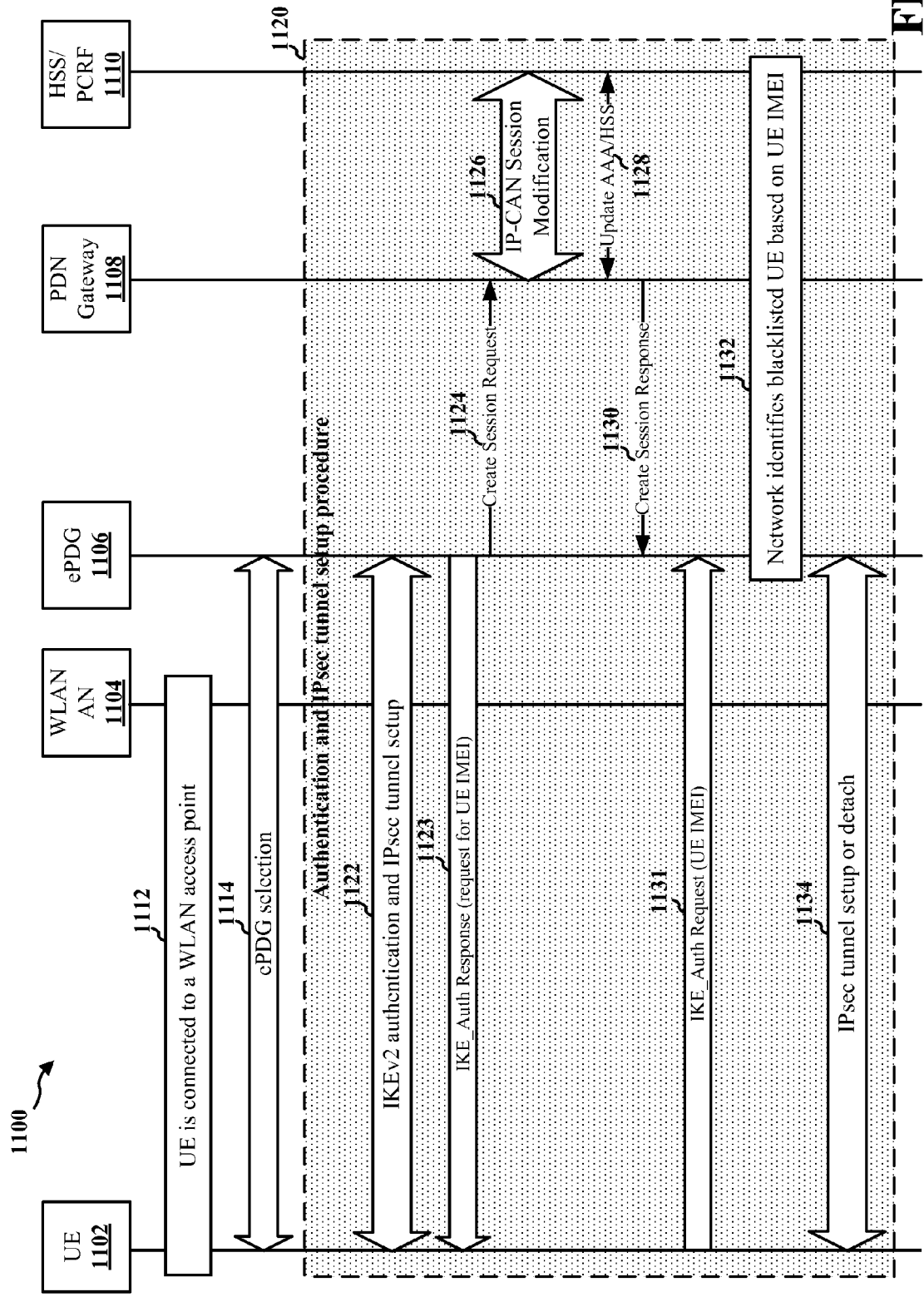
FIG. 11 is an example flow diagram illustrating a procedure to determine whether to maintain UE's connection to a core network via a WLAN access network, according to a fourth aspect of the disclosure.

FIG. 11 is an example flow diagram 1100 illustrating a procedure to determine whether to maintain UE's connection to a core network via a WLAN access network, according to a fourth aspect of the disclosure. The example flow diagram 1100 involves a UE 1102, a WLAN AN 1104, an ePDG 1106, a PDN gateway 1108, and an HSS/PCRF 1110. At 1112, the UE 1102 connects to the WLAN AN 1104 via a WLAN access point, and thus the UE 1102 is assigned a local IP address. At 1114, after connecting to the WLAN AN 1104, the UE 1102 performs an ePDG selection procedure via the WLAN AN 1104 to select the ePDG 1106. In particular, at 1114, the UE 1102 determines to access the carrier's core network via WLAN, and thus performs an ePDG discovery procedure to find an ePDG (e.g., the ePDG 1106) to select.

At 1120, steps for authentication and IPsec tunnel setup procedure are performed to establish a secure tunnel between the UE 1102 and the ePDG 1106, such that the ePDG will be able to set up a tunnel with the PDN gateway 1108. In particular, at 1122, the UE 1102 initiates an authentication, such as IKEv2 authentication, and an IPSec tunnel setup with the ePDG 1106 via the WLAN AN 1104. During the authentication and IPsec tunnel setup procedure, at 1123, the ePDG 1106 sends the UE 1102 an information request to request for the UE's IMEI, via the WLAN AN 1104. The IMEI is a device identifier that is specific to the UE. At 1124, the ePDG 1106 sends a request to create a session to the PDN gateway 1108. In response, at 1126, the PDN gateway 1108 communicates with the HSS/PCRF 1110 to modify an IP-CAN session, according to the session create request from the ePDG 1106, in order to provide IP connectivity to the UE 1102. At 1128, the PDN gateway 1108 communicates with the HSS/PCRF 1110 to update an AAA function and an appropriate HSS address. At 1130, the PDN gateway 1130 sends the ePDG 1106 a response to the create session request, indicating that the IP-CAN session has been created/modified. In response to the information request received at 1123, the UE 1002 sends at 1031 the information response including the IMEI of the UE 1102 to the ePDG 1106 via the WLAN AN 1104. At 1132, core network entities including the ePDG 1106, the PDN gateway 1130, the HSS/PCRF 1110, etc. determine whether the IMEI of the UE 1102 is blacklisted. It is noted that, according to another aspect, steps 1123, 1131, and 1132 may take place in sequence and may take place any time between step 1122 and step 1134.

At 1134, if the core network identities determine that that the IMEI of the UE 1102 is blacklisted, the core network entities (e.g., the ePDG 1106) detach the UE 1102, and stops the IPSec tunnel setup, such that the UE 1102 can no longer communicate with the core network via the WLAN AN 1104. In such a case, for example, the core network entities (e.g., the ePDG 1106) may send to the UE 1102 a detachment indication indicating to disable a connection between the UE 1102 and the core network entities, and the UE may subsequently refrain from requesting or maintaining the connection between the UE 1102 and the core network entities upon receiving the detachment indication. At 1134, if the core network identities determine that that the IMEI of the UE 1102 is not blacklisted, the UE 1102 communicates with the ePDG 1106 via the WLAN AN 1104 to complete the IPSec tunnel setup to provide a secure tunnel between the UE 1102 and the ePDG 1106, and the ePDG 1106 establishes a tunnel with the PDN gateway 1130.

Figure 12A:
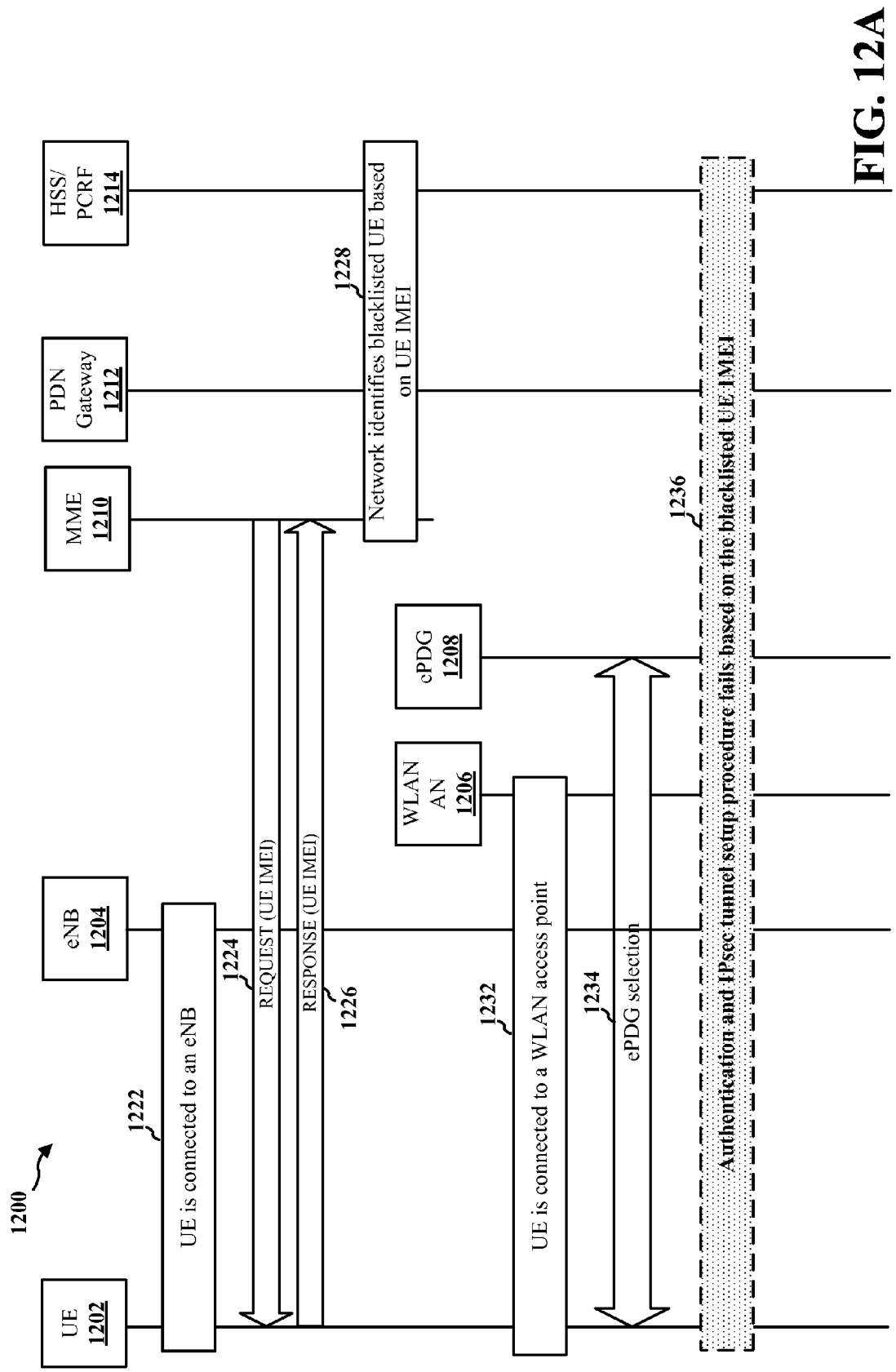
FIG. 12A is an example flow diagram illustrating a procedure to determine whether to maintain UE's connection to a core network via a WLAN access network, according to a first example of a fifth aspect of the disclosure.

FIG. 12A is an example flow diagram 1200 illustrating a procedure to determine whether to maintain UE's connection to a core network via a WLAN access network, according to a first example of a fifth aspect of the disclosure. The example flow diagram involves a UE 1202, an eNB 1204, a WLAN AN 1206, an ePDG 1208, a MME 1210, a PDN gateway 1212, and an HSS/PCRF 1214. At 1222, the UE 1202 connects to the eNB 1204 to access a core network via LTE. For example, when a user activates (turns on) the UE 1202, the UE 1202 may access the core network via LTE first. At 1224, the MME 1210 sends a request for the UE's IMEI, via the eNB 1204. In response, at 1226, the UE 1202 sends a response including the IMEI of the UE 1202 to the MME 1210 via the eNB 1204. At this point, the core network receives the IMEI of the UE 1202. Thus, at 1228, core network entities including the MME 1210, the PDN gateway 1212, the HSS/PCRF 1214, etc. determine whether the IMEI of the UE 1202 is blacklisted.

At 1232, the UE 1202 connects to the WLAN AN 1206 via a WLAN access point, and thus the UE 1202 is assigned a local IP address. At 1234, after connecting to the WLAN AN 1206, the UE 1202 performs an ePDG selection procedure via the WLAN AN 1206 to select the ePDG 1208. In particular, at 1234, the UE 1202 determines to access the carrier's core network via WLAN, and thus performs an ePDG discovery procedure to find an ePDG (e.g., the ePDG 1208) to select. At 1236, steps for authentication and IPsec tunnel setup procedure are performed to establish a secure tunnel between the UE 1202 and the ePDG 1208, such that the ePDG 1208 will be able to set up a tunnel with the PDN gateway 1212. The steps for the authentication and IPsec tunnel setup procedure 1236 may include steps equivalent to the steps 822 through 832 as illustrated in FIG. 8. During the authentication and IPsec tunnel setup procedure, the determination (e.g., from 1228) on whether the IMEI of the UE 1202 is blacklisted is conveyed to at least one of the core network entities (e.g., the ePDG 1208, the MME 1210, the PDN gateway 1212, etc). At 1236, if the core network entities (e.g., the MME 1210, the PDN gateway 1212, the HSS/PCRF 1214, etc.) have determined at 1228 that the IMEI of the UE 1202 is blacklisted, the authentication and IPsec tunnel setup procedure fails and thus the UE 1202 is disconnected from the core network. At 1236, if the core network entities have determined at 1228 that the IMEI of the UE 1202 is not blacklisted, the authentication and IPsec tunnel setup procedure is completed to establish secure communication between the UE 1202 and the core network via the WLAN AN 1206, in a similar manner as the steps 822 through 832 of FIG. 8. For example, at 1236, the ePDG 1208 may receive (e.g., from the HSS/PCRF 1214 or the PDN Gateway 1212 or the MME 1210) a notification including determination on whether the IMEI of the UE 1202 is blacklisted, and may disconnect the UE 1202 based on the notification.

Figure 12B:
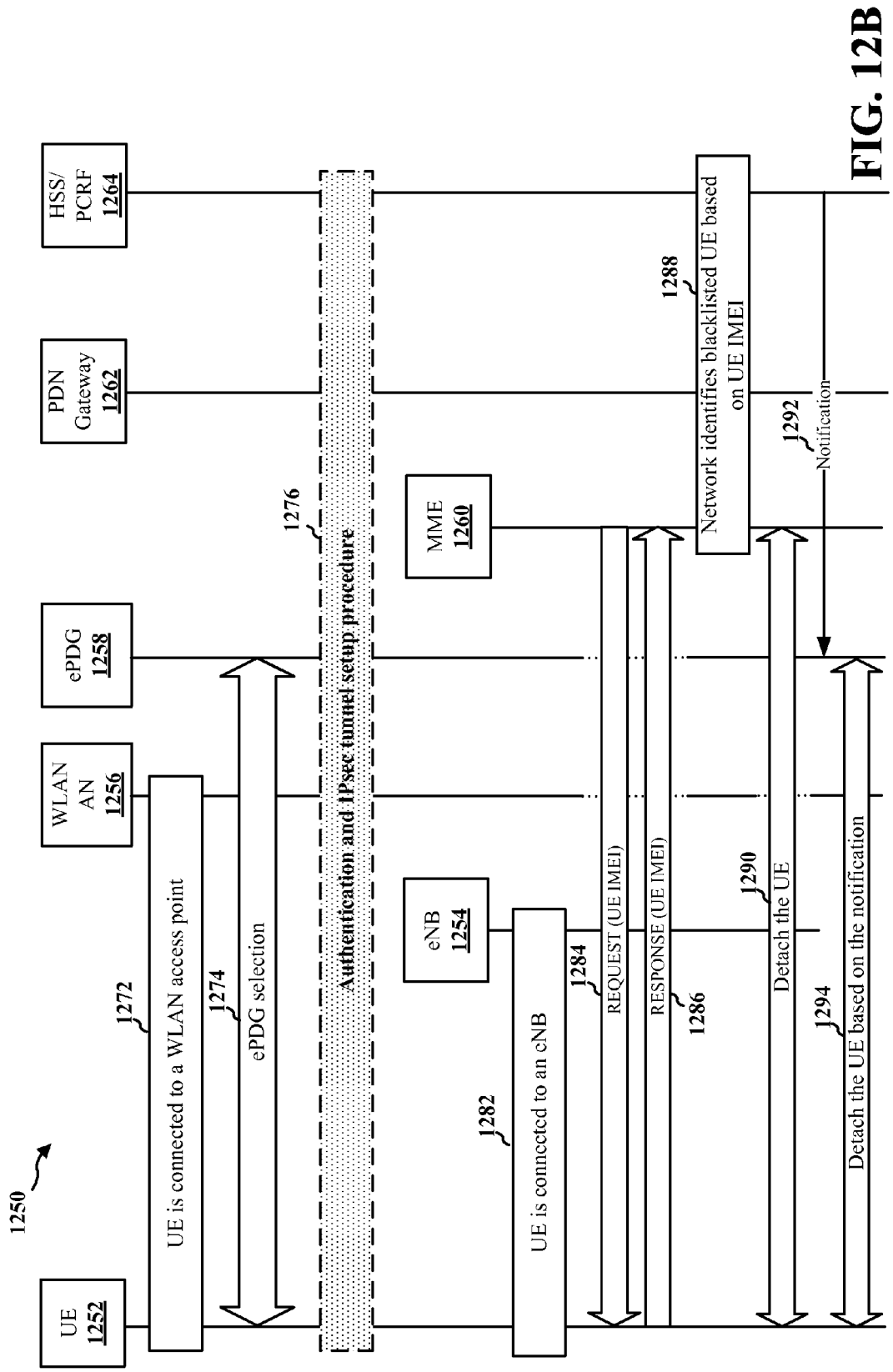
FIG. 12B is an example flow diagram illustrating a procedure to determine whether to maintain UE's connection to a core network via a WLAN access network, according to a second example of the fifth aspect of the disclosure.

FIG. 12B is an example flow diagram 1250 illustrating a procedure to determine whether to maintain UE's connection to a core network via a WLAN access network, according to a second example of the fifth aspect of the disclosure. The example flow diagram involves a UE 1252, an eNB 1254, a WLAN AN 1256, an ePDG 1258, a MME 1260, a PDN gateway 1262, and an HSS/PCRF 1264. At 1272, the UE 1252 connects to the WLAN AN 1256 via a WLAN access point, and thus the UE 1252 is assigned a local IP address. At 1274, after connecting to the WLAN AN 1256, the UE 1252 performs an ePDG selection procedure via the WLAN AN 1256 to select the ePDG 1258. In particular, at 1274, the UE 1252 determines to access the carrier's core network via WLAN, and thus performs an ePDG discovery procedure to find an ePDG (e.g., the ePDG 1258) to select. At 1276, steps for authentication and IPsec tunnel setup procedure are performed to establish a secure tunnel between the UE 1252 and the ePDG 1258, such that the ePDG 1258 will be able to set up a tunnel with the PDN gateway 1262. The steps for the authentication and IPsec tunnel setup procedure 1276 may be equivalent to the steps 822 through 832 as illustrated in FIG. 8.

At 1282, the UE 1252 connects to the eNB 1254 to access a core network via LTE. At 1284, the MME 1260 sends a request for the UE's IMEI, via the MME 1260 and the eNB 1254. In response, at 1286, the UE 1252 sends a response including the IMEI of the UE 1252 to the MME 1260 via the eNB 1254. At this point, the core network receives the IMEI of the UE 1252. Thus, at 1288, core network entities including the MME 1260, the PDN gateway 1262, the HSS/PCRF 1264, etc. determine whether the IMEI of the UE 1252 is blacklisted. If the core network entities (e.g., the MME 1260, the PDN gateway 1262, the HSS/PCRF 1264) determine that the IMEI of the UE 1252 is blacklisted, the MME 1260 detaches at 1290 the UE 1290 from the core network such that the UE 1202 can no longer connect to the core network via the eNB 1254. Further, at 1292, the HSS/PCRF 1264 sends a notification to the ePDG 1258 if the core network entities (e.g., the MME 1260, the PDN gateway 1262, the HSS/PCRF 1264) have determined at 1288 that the IMEI of the UE 1252 is blacklisted. Upon receiving such notification, at 1294, the core network entities (e.g., via the ePDG 1258) detach the UE 1252 such that the UE 1252 can no longer connect to the core network via the WLAN AN 1256. If the ePDG 1258 does not receive a notification that the IMEI of the UE 1252 is blacklisted, the core network entities maintain the connection between the UE 1252 and the core network via the WLAN AN 1256 and/or the eNB 1254.

Figures 13, 14:
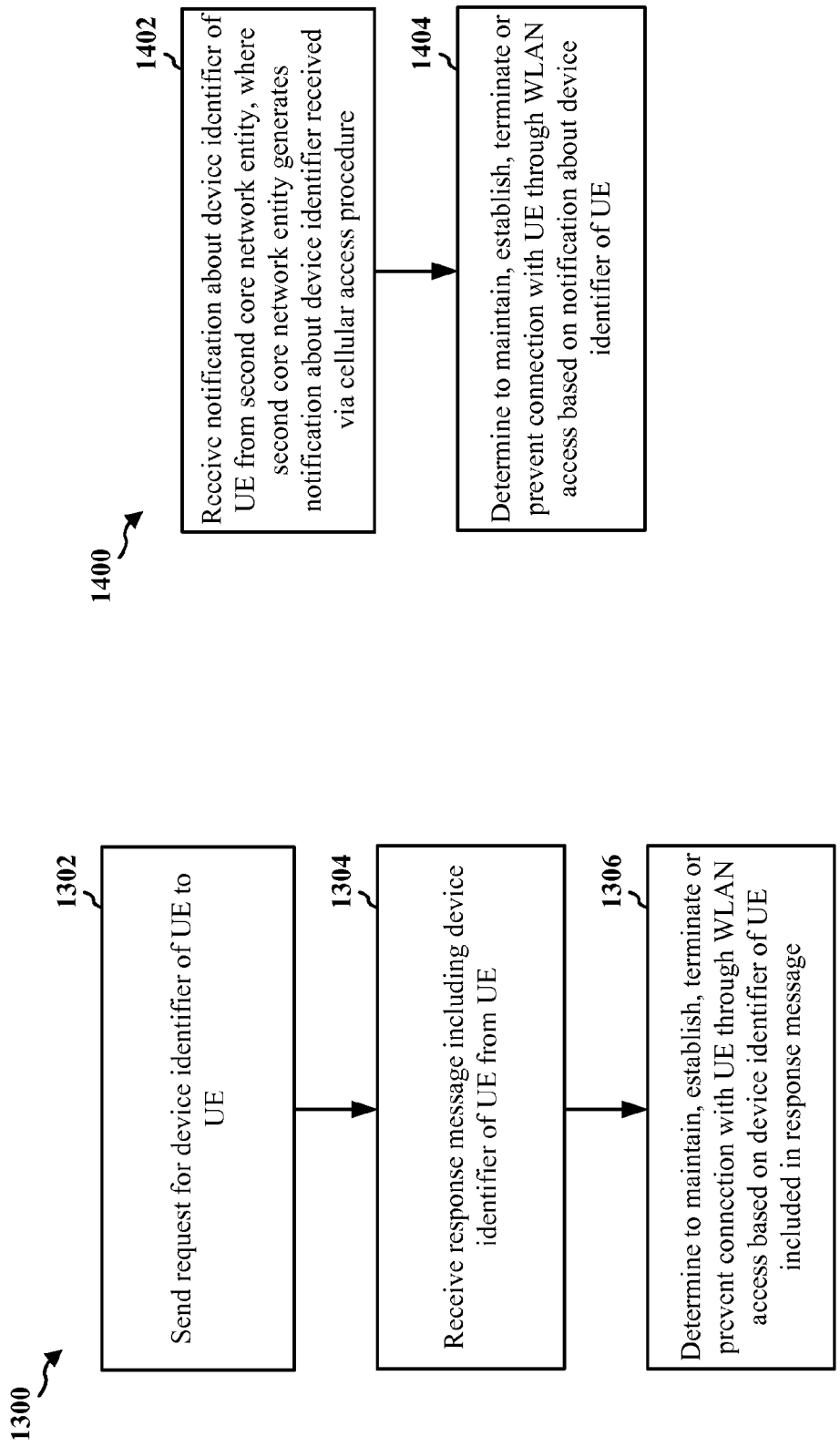
FIG. 13 is a flow chart of a method of wireless communication, according to one aspect of the disclosure.
FIG. 14 is a flow chart of a method of wireless communication, according to another aspect of the disclosure.

FIG. 13 is a flow chart 1300 of a method of wireless communication, according to one aspect of the disclosure. The method may be performed by a core network entity (e.g., the ePDG 740, the apparatus 1502/1502'). At step 1302, the core network sends a request for a device identifier of a UE to the UE. For example, referring back to FIG. 8, at 842, the ePDG 806 sends the UE 802 an information request to request for the UE's IMEI, via the WLAN AN 804. At step 1304, the core network receives a response message including the device identifier of the UE from the UE. For example, referring back to FIG. 8, at 844, the UE 802 sends the information response including the IMEI of the UE 802 to the ePDG 806 via the WLAN AN 804. In an aspect, the core network entity receives the response message using a security association established between the UE and the core network entity. For example, as discussed supra, the information request and/or the information response are communicated between the UE 802 and the ePDG 806 using the security association (such as the IPsec tunnel between the UE 802 and the ePDG 806). In such an aspect, the security association is established during an authentication and tunnel setup procedure between the UE and the core network entity. For example, as discussed supra, at 820, steps for authentication and IP security (IPsec) tunnel setup procedure are performed to establish a secure tunnel between the UE 802 and the ePDG 806, such that the ePDG will be able to set up a tunnel with the PDN gateway 808.

In an aspect, the request is sent and the response message is received during an authentication procedure or after the authentication procedure to set up a security tunnel between the UE and the core network entity. For example, as discussed supra, during the authentication and IPsec tunnel setup procedure, at 1123, the ePDG 1106 sends the UE 1102 an information request to request for the UE's IMEI, via the WLAN AN 1104, and the UE 1002 sends at 1134 the information response including the IMEI of the UE 1102 to the ePDG 1106 via the WLAN AN 1104.

At 1306, the core network determines to maintain, establish, terminate or prevent a connection with the UE through WLAN access based on the device identifier of the UE included in the response message. In an aspect, the core network determines to maintain, establish, terminate or prevent the connection with the UE through the WLAN access by determining whether the device identifier is blacklisted, and disconnecting the UE from a core network upon determining that the device identifier is blacklisted, or maintaining the connection between the UE and the core network upon determining that the device identifier is not blacklisted. In an aspect, the core network entity determines whether the device identifier is blacklisted based on the device identifier received from the UE over the WLAN access. For example, as discussed supra, at 846, core network entities including the ePDG 806, the PDN gateway 830, the HSS/PCRF 810, etc. determine whether the IMEI of the UE 802 is blacklisted. As discussed supra, for example, when the core network entities determine that the IMEI of the UE 802 is blacklisted, at 848, the core network entities (e.g., the ePDG 806) detach the UE 802 such that the UE 802 can no longer communicate with the core network via the WLAN AN 804. On the other hand, as discussed supra, for example, when the core network entities determine that the IMEI of the UE 802 is not blacklisted, the core network entities (e.g., the ePDG 806) maintain the connection between the UE 802 and the core network via the WLAN AN 804. In an aspect, the device identifier includes at least one of an IMEI of the UE or a WLAN MAC address of the UE. For example, FIG. 8 illustrates an example where an IMEI of the UE is used as the device identifier, and FIG. 9 illustrates an example where a WLAN MAC address of the UE is used as the device identifier. In an aspect, the core network entity is an ePDG.

FIG. 14 is a flow chart 1400 of a method of wireless communication, according to another aspect of the disclosure. The method may be performed by a core network entity (e.g., the ePDG 740, the apparatus 1502/1502'). At step 1402, the core network entity receives a notification about a device identifier of a UE from a second core network entity, where the notification of the device identifier is generated based on the device identifier that was received via a cellular access procedure (e.g., LTE access procedure). For example, as discussed supra, according to the first example, at 1226, the UE 1202 sends a response including the IMEI of the UE 1202 to the MME 1210 via the eNB 1204. As discussed supra, according to the first example, during the authentication and IPsec tunnel setup procedure, the determination (e.g., from 1228) on whether the IMEI of the UE 1202 is blacklisted is conveyed to at least one of the core network entities. For example, as discussed supra, at 1236, the ePDG 1208 may receive (e.g., from the HSS/PCRF 1214 or the PDN Gateway 1212 or the MME 1210) a notification including determination on whether the IMEI of the UE 1202 is blacklisted, and may disconnect the UE 1202 based on the notification. In an aspect, the device identifier includes an IMEI of the UE. For example, as discussed supra, according to the second example, at 1286, the UE 1252 sends a response including the IMEI of the UE 1252 to the MME 1260 via the eNB 1254. As discussed supra, according to the second example, at 1292, the HSS/PCRF 1264 sends a notification to the ePDG 1258 if the core network entities (e.g., the MME 1260, the PDN gateway 1262, the HSS/PCRF 1264) have determined at 1288 that the IMEI of the UE 1252 is blacklisted.

At step 1404, the core network entity determines to maintain, establish, terminate or prevent a connection with the UE through WLAN access based on the notification about the device identifier of the UE. In an aspect, the core network entity determines to maintain, establish, terminate or prevent the connection with the UE through the WLAN access by determining whether the device identifier is blacklisted based on the notification about the device identifier during an authentication procedure, and causing failure in the authentication procedure to prevent the UE from having a connection through the WLAN access to a core network upon determining that the device identifier is blacklisted, or completing the authentication procedure to establish the connection between the UE and the core network upon determining that the device identifier is not blacklisted. For example, as discussed supra, according to the first example, at 1236, if the core network entities (e.g., the MME 1210, the PDN gateway 830, the HSS/PCRF 1214, etc.) have determined at 1228 that the IMEI of the UE 1202 is blacklisted, the authentication and IPsec tunnel setup procedure fails and thus the UE 1202 is disconnected from the core network. As discussed supra, according to the first example, at 1236, if the core network entities have determined at 1228 that the IMEI of the UE 1202 is not blacklisted, the authentication and IPsec tunnel setup procedure is completed to establish secure communication between the UE 1202 and the core network via the WLAN AN 1206, in a similar manner as the steps 822 through 832 of FIG. 8. In an aspect, the core network entity disconnects the UE from the core network upon determining that the device identifier is blacklisted by sending a detachment indication to the UE indicating to prevent a connection between the UE and the core network entity upon determining that the device identifier is blacklisted. For example, as discussed supra, the core network entities (e.g., the ePDG 906) may send to the UE 902 a detachment indication indicating to disable a connection between the UE 902 and the core network entities, and the UE may subsequently refrain from requesting or maintaining the connection between the UE 902 and the core network entities upon receiving the detachment indication.

In an aspect, the core network entity determines to maintain, establish, terminate or prevent the connection with the UE through the WLAN access by determining whether the device identifier is blacklisted based on the notification about the device identifier, and disconnecting the UE from a core network upon determining that the device identifier is blacklisted, or maintaining the connection between the UE and the core network upon determining that the device identifier is not blacklisted. For example, as discussed supra, according to the second example, upon receiving the notification from the HSS/PCRF 1264, at 1294, the core network entities (e.g., via the ePDG 1258) detach the UE 1252 such that the UE 1252 can no longer connect to the core network via the WLAN AN 1256. As discussed supra, according to the second example, if the ePDG 1258 does not receive a notification that the IMEI of the UE 1252 is blacklisted, the core network entities maintain the connection between the UE 1252 and the core network via the WLAN AN 1256. In an aspect, the core network entity is an ePDG.

Figure 15:
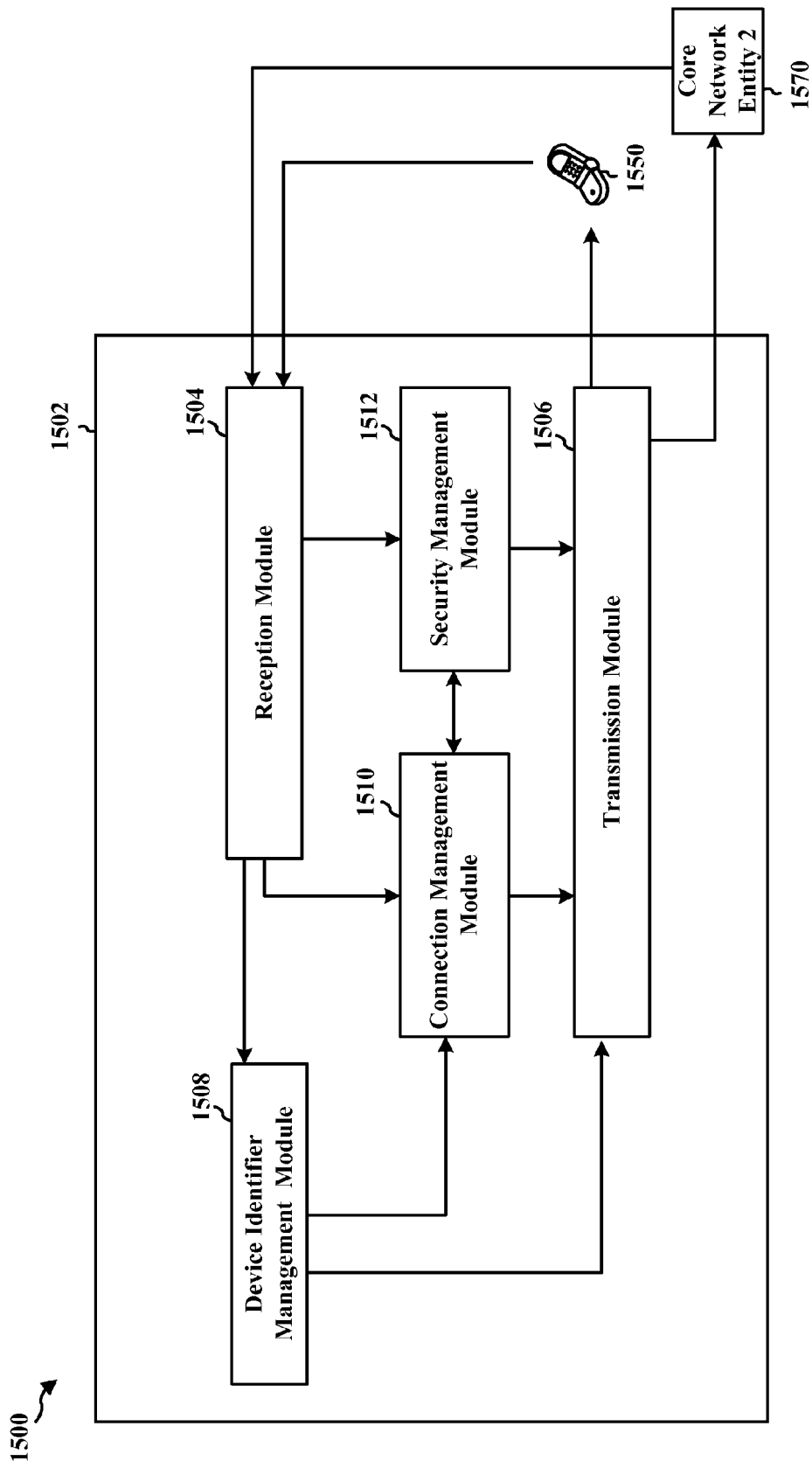
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a core network entity such as the ePDG. The apparatus includes a reception module 1504, a transmission module 1506, a device identifier management module 1508, a connection management module 1510, and a security management module 1512.

In one aspect of the disclosure, the device identifier management module 1508 sends via the transmission module 1506 a request for a device identifier of a UE 1550 to the UE 1550. The device identifier management module 1508 receives via the reception module 1504 a response message including the device identifier of the UE 1550 from the UE 1550. In an aspect, the device identifier management module 1508 receives the response message using a security association established between the UE 1550 and the apparatus. In an aspect, the security association is established by performing an authentication procedure via the security management module 1512 to set up a security tunnel between the UE and the apparatus. In an aspect, the request is sent and the response message is received during an authentication procedure or after the authentication procedure to set up a security tunnel between the UE and the core network entity. The connection management module 1510 determines to maintain, establish, terminate or prevent a connection with the UE 1550 through WLAN access based on the device identifier of the UE. In an aspect, the connection management module 1510 determines to maintain, establish, terminate or prevent the connection with the UE 1550 through the WLAN access by determining whether the device identifier is blacklisted, and disconnecting the UE 1550 from a core network upon determining that the device identifier is blacklisted, or maintaining the connection between the UE 1550 and the core network upon determining that the device identifier is not blacklisted. In an aspect, the connection management module 1510 determines whether the device identifier is blacklisted based on the device identifier received from the UE 1550 over the WLAN access via the reception module 1504 and the device identifier management module 1508. In an aspect, the connection management module 1510 disconnects the the UE from the core network upon determining that the device identifier is blacklisted by sending a detachment indication to the UE indicating to prevent a connection between the UE and the core network entity upon determining that the device identifier is blacklisted. In an aspect, the device identifier includes at least one of an IMEI of the UE 1550 or a WLAN MAC address of the UE 1550. In an aspect, the apparatus is an ePDG.

In another aspect of the disclosure, the connection management module 1510 receives via the reception module 1504 a notification about a device identifier of a UE from a second core network entity 1570, where the notification about the device identifier is generated based on the device identifier that was received via a cellular access procedure (e.g., LTE access procedure). In an aspect, the device identifier includes an IMEI of the UE 1550. The connection management module 1510 determines to maintain, establish, terminate or prevent a connection with the UE 1550 through WLAN access based on the notification about the device identifier of the UE 1550. In an aspect, the connection management module 1510 determines to maintain, establish, terminate or prevent the connection with the UE 1550 through the WLAN access by determining whether the device identifier is blacklisted based on the notification about the device identifier, and disconnecting the UE 1550 from a core network upon determining that the device identifier is blacklisted, or maintaining the connection between the UE 1550 and the core network upon determining that the device identifier is not blacklisted. In an aspect, the connection management module 1510 determines to maintain, establish, terminate or prevent the connection with the UE 1550 through the WLAN access by determining whether the device identifier is blacklisted based on the notification about the device identifier during an authentication procedure, and causing failure in the authentication procedure via the security management module 1512 to prevent the UE 1550 from a core network upon determining that the device identifier is blacklisted, or completing the authentication procedure via the security management module 1512 to establish the connection between the UE 1550 and the core network upon determining that the device identifier is not blacklisted.

The apparatus may include additional modules that perform each of the steps of the algorithm in the aforementioned flow charts of FIGS. 13 and 14. As such, each step in the aforementioned flow charts of FIGS. 13 and 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
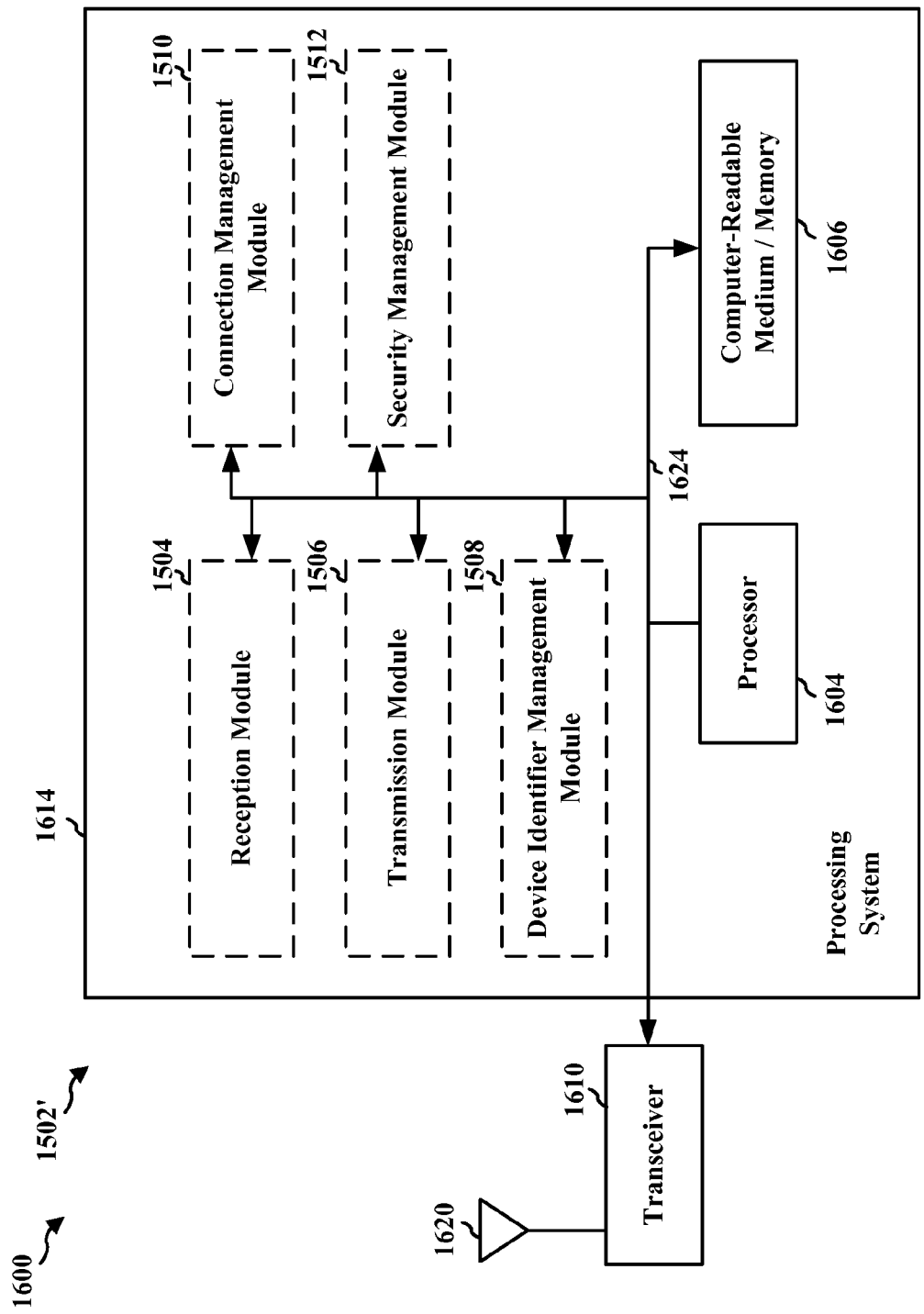
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, 1512, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception module 1504. In addition, the transceiver 1610 receives information from the processing system 1614, specifically the transmission module 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the modules 1504, 1506, 1508, 1510, and 1512. The modules may be software modules running in the processor 1604, resident/stored in the computer readable medium/memory 1606, one or more hardware modules coupled to the processor 1604, or some combination thereof.

In one configuration, the apparatus 1502/1502' for wireless communication includes means for sending, by the apparatus 1502/1502', a request for a device identifier of a UE to the UE, means for receiving, by the apparatus 1502/1502', a response message including the device identifier of the UE from the UE, and means for determining, by the apparatus 1502/1502', to maintain, establish, terminate or prevent a connection with the UE through WLAN access based on the device identifier of the UE included in the response message. In another configuration, the apparatus 1502/1502' for wireless communication includes means for receiving, by the apparatus 1502/1502', a notification about a device identifier of a UE from a second core network entity, where the notification about the device identifier is generated based on the device identifier that was received via a cellular access procedure, and means for determining, by the apparatus 1502/1502', to maintain, establish, terminate or prevent a connection with the UE through WLAN access based on the notification about the device identifier of the UE. The aforementioned means may be one or more of the aforementioned modules of the apparatus 1502 and/or the processing system 1614 of the apparatus 1502' configured to perform the functions recited by the aforementioned means.

Figure 17:
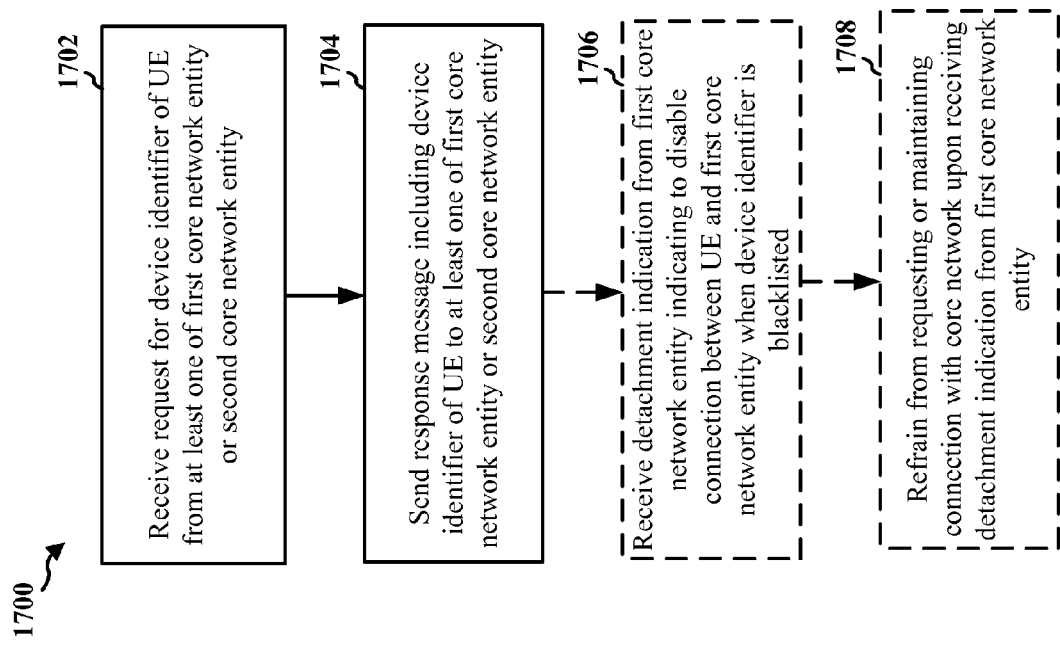
FIG. 17 is a flow chart of a method of wireless communication, according to another aspect of the disclosure.

FIG. 17 is a flow chart 1700 of a method of wireless communication, according to another aspect of the disclosure. The method may be performed by a UE (e.g., the UE 102, the UE 650, the UE 702, the apparatus 1902/1902'). At step 1702, the UE receives a request for a device identifier of the UE from at least one of a first core network entity or a second network entity. At step 1704, the UE sends a response message including the device identifier of the UE to at least one of the first core network entity or the second core network entity, where at least one of the first core network entity or the second core network entity is configured to determine to maintain, establish, terminate or prevent a connection with the UE through WLAN access based on the device identifier of the UE included in the response message.

In one aspect, for example, referring back to FIG. 8, at 842, the ePDG 806 sends the UE 802 an information request to request for the UE's IMEI, via the WLAN AN 804. For example, referring back to FIG. 8, at 844, the UE 802 sends the information response including the IMEI of the UE 802 to the ePDG 806 via the WLAN AN 804. In an aspect, the UE sends the response message using a security association established between the UE and the first core network entity. For example, as discussed supra, the information request and/or the information response are communicated between the UE 802 and the ePDG 806 using the security association (such as the IPsec tunnel between the UE 802 and the ePDG 806). In such an aspect, the security association is established during an authentication and tunnel setup procedure between the UE and the first core network entity. For example, as discussed supra, at 820, steps for authentication and IPsec tunnel setup procedure are performed to establish a secure tunnel between the UE 802 and the ePDG 806, such that the ePDG will be able to set up a tunnel with the PDN gateway 808.

In an aspect, the request is received and the response message is sent during an authentication procedure or after the authentication procedure to set up a security tunnel between the UE and the first core network entity. For example, as discussed supra, during the authentication and IPsec tunnel setup procedure, at 1123, the ePDG 1106 sends the UE 1102 an information request to request for the UE's IMEI, via the WLAN AN 1104, and the UE 1002 sends at 1134 the information response including the IMEI of the UE 1102 to the ePDG 1106 via the WLAN AN 1104.

In one aspect, the first core network entity is configured to determine to maintain, establish, terminate or prevent the connection with the UE through the WLAN access by determining whether the device identifier is blacklisted, and disconnecting the UE from the core network upon determining that the device identifier is blacklisted, or maintaining the connection between the UE and the core network upon determining that the device identifier is not blacklisted. In such an aspect, the first core network entity is configured to determine whether the device identifier is blacklisted based on the device identifier received from the UE over the WLAN access. For example, as discussed supra, at 846, core network entities including the ePDG 806, the PDN gateway 830, the HSS/PCRF 810, etc. determine whether the IMEI of the UE 802 is blacklisted. As discussed supra, for example, when the core network entities determine that the IMEI of the UE 802 is blacklisted, at 848, the core network entities (e.g., the ePDG 806) detach the UE 802 such that the UE 802 can no longer communicate with the core network via the WLAN AN 804. On the other hand, as discussed supra, for example, when the core network entities determine that the IMEI of the UE 802 is not blacklisted, the core network entities (e.g., the ePDG 806) maintain the connection between the UE 802 and the core network via the WLAN AN 804. In an aspect, the core network entity is an evolved packet data gateway. In an aspect, the device identifier includes at least one of an IMEI of the UE or a WLAN MAC address of the UE. For example, FIG. 8 illustrates an example where an IMEI of the UE is used as the device identifier, and FIG. 9 illustrates an example where a WLAN MAC address of the UE is used as the device identifier.

In one aspect, at 1706, the UE may receive a detachment indication from the first core network entity indicating to prevent a connection between the UE and the first core network entity when the device identifier is blacklisted. In an aspect, the UE may refrain from requesting the connection with the core network upon receiving the detachment indication from the first core network entity. For example, as discussed supra, the core network entities (e.g., the ePDG 906) may send to the UE 902 a detachment indication indicating to disable a connection between the UE 902 and the core network entities, and the UE may subsequently refrain from requesting or maintaining the connection between the UE 902 and the core network entities upon receiving the detachment indication.

In another aspect of the disclosure, the second core network entity is configured to receive the response message including the device identifier from the UE via a cellular access procedure (e.g., LTE access procedure), and the firstcore network entity is configured to receive a notification about the device identifier if the device identifier is blacklisted, and the first core network entity is configured to determine to maintain, establish, terminate or prevent the connection with the UE through the WLAN access based on the notification about the device identifier. In such an aspect, the second core network entity is an evolved packet data gateway. For example, as discussed supra, at 1224, the MME 1210 sends a request for the UE's IMEI, via the eNB 1204, and at 1226, the UE 1202 sends a response including the IMEI of the UE 1202 to the MME 1210 via the eNB 1204. As discussed supra, for example, at 1236, the ePDG 1208 may receive (e.g., from the HSS/PCRF 1214 or the PDN Gateway 1212 or the MME 1210) a notification including determination on whether the IMEI of the UE 1202 is blacklisted, and may disconnect the UE 1202 based on the notification.

In such an aspect, according to one example, the first core network entity is configured to determine to maintain, establish, terminate or prevent the connection with the UE through the WLAN access by determining whether the device identifier is blacklisted based on the notification during an authentication procedure, and causing failure in the authentication procedure to prevent the UE from having a connection through the WLAN access to the core network upon determining that the device identifier is blacklisted, or completing the authentication procedure to establish the connection between the UE and the core network upon determining that the device identifier is not blacklisted. For example, as discussed supra, according to the first example, at 1236, if the core network entities (e.g., the MME 1210, the PDN gateway 1212, the HSS/PCRF 1214, etc.) have determined at 1228 that the IMEI of the UE 1202 is blacklisted, the authentication and IPsec tunnel setup procedure fails and thus the UE 1202 is disconnected from the core network. As discussed supra, according to the first example, at 1236, if the core network entities have determined at 1228 that the IMEI of the UE 1002 is not blacklisted, the authentication and IPsec tunnel setup procedure is completed to establish secure communication between the UE 1202 and the core network via the WLAN AN 1206, in a similar manner as the steps 822 through 832 of FIG. 8.

In such an aspect, according to another example, the first core network entity is configured to determine to maintain, establish, terminate or prevent the connection with the UE through the WLAN access by determining whether the device identifier is blacklisted based on the notification, and disconnecting the UE from the core network upon determining that the device identifier is blacklisted, or maintaining the connection between the UE and the core network upon determining that the device identifier is not blacklisted. For example, as discussed supra, according to the second example, upon receiving the notification from the HSS/PCRF 1264, at 1294, the core network entities (e.g., via the ePDG 1258) detach the UE 1052 such that the UE 1252 can no longer connect to the core network via the WLAN AN 1256. As discussed supra, according to the second example, if the ePDG 1258 does not receive a notification that the IMEI of the UE 1252 is blacklisted, the core network entities maintain the connection between the UE 1252 and the core network via the WLAN AN 1256.

Figure 18:
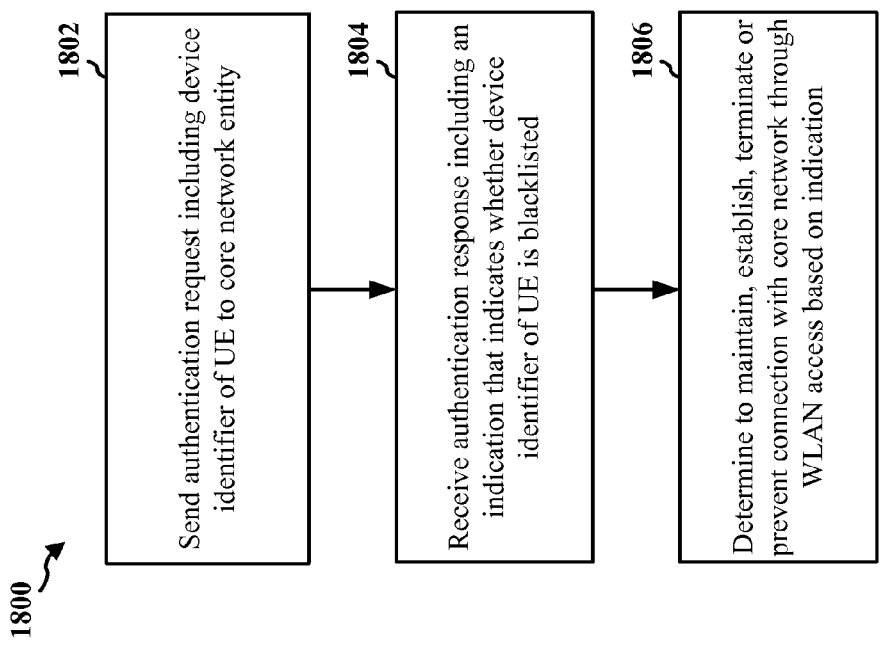
FIG. 18 is a flow chart of a method of wireless communication, according to another aspect of the disclosure.

FIG. 18 is a flow chart 1800 of a method of wireless communication, according to another aspect of the disclosure. The method may be performed by a UE (e.g., the UE 102, the UE 650, the UE 702, the apparatus 1902/1902'). At step 1802, the UE sends an authentication request including a device identifier of the UE to a core network entity. In an aspect, the device identifier includes an IMEI of the UE. For example, as discussed supra, the UE 1002 sends the ePDG 1006 an authentication request (e.g., internet key exchange (IKE) authentication request), via the WLAN AN 1004, where the authentication request includes the UE's IMEI. At step 1804, the UE receives an authentication response including an indication that indicates whether the device identifier of the UE is blacklisted. For example, as discussed supra, the ePDG 1006 sends an authentication response to the UE 1002 via the WLAN AN 1004, where the authentication response includes information about whether the UE's IMEI included in the authentication request is blacklisted, based on the determination at 1032. In an aspect, the authentication request is sent and the authentication response is received during an authentication procedure to set up a security tunnel between the UE and the core network entity. For example, as illustrated in FIG. 10, the authentication request at 1022 is sent and the authentication response is received during the authentication and IPsec tunnel setup procedure 1020.

At step 1806, the UE determines to maintain, establish, terminate or prevent a connection with a core network through WLAN access based on the indication. In an aspect, the UE determines to maintain, establish, terminate or prevent the connection with the core network through the WLAN by disconnecting from the core network when the indication indicates that the device identifier of the UE is blacklisted, or maintaining the connection with the core network when the indication indicates that the device identifier is not blacklisted. For example, as discussed supra, at 1034, if the authentication response indicates that the IMEI of the UE 1002 is blacklisted, the UE 1002 detaches from the core network (e.g., by disconnecting from the ePDG 1006), and stops the IPSec tunnel setup. For example, as discussed supra, at 1034, if the authentication response does not indicate that the IMEI of the UE 1002 is blacklisted, the UE 1002 communicates with the ePDG 1006 via the WLAN AN 1004 to complete the IPSec tunnel setup to provide a secure tunnel between the UE 1002 and the ePDG 1006, and the ePDG 1006 establishes a tunnel with the PDN gateway 1030

Figure 19:
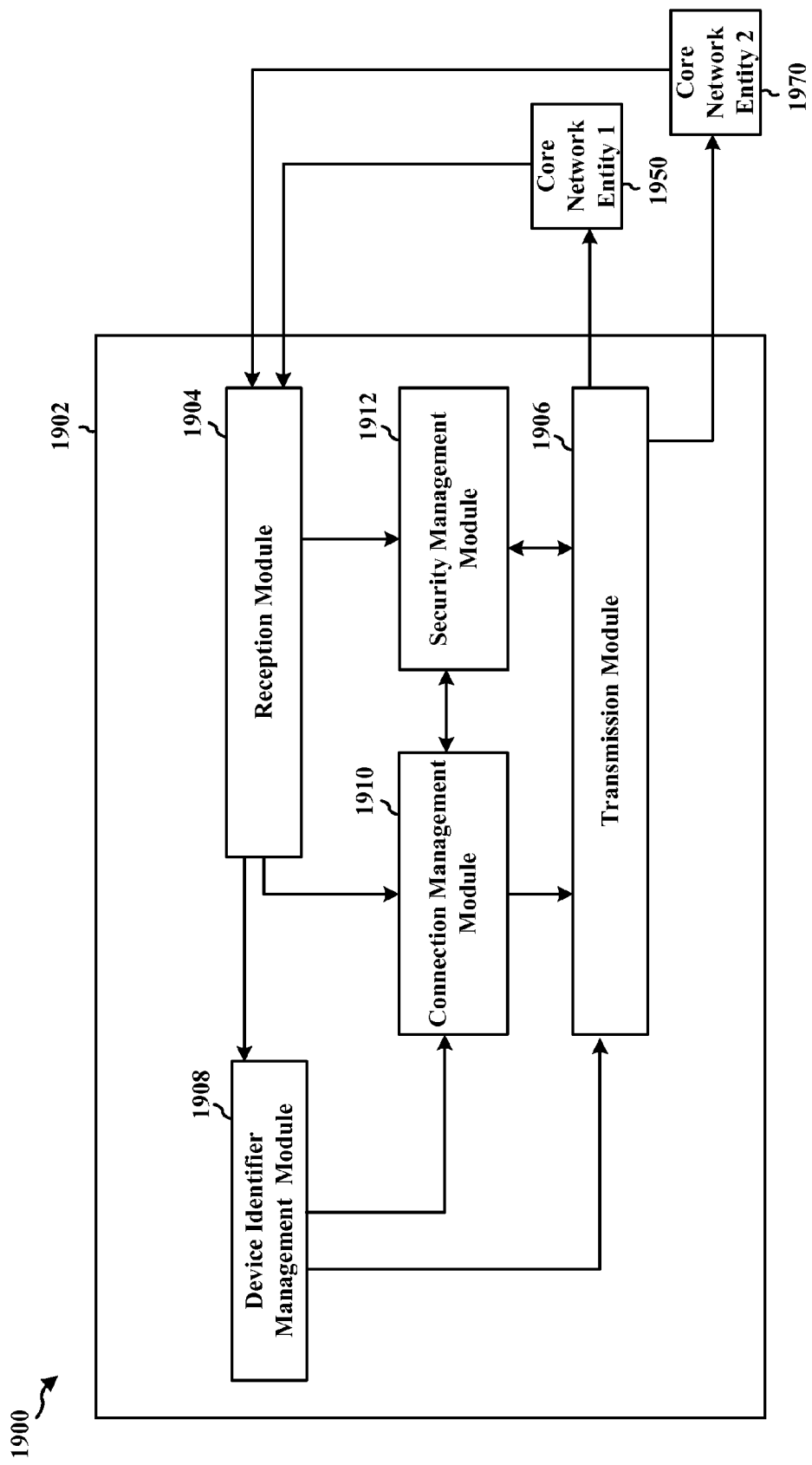
FIG. 19 is a conceptual data flow diagram illustrating the data flow between different modules/means/components in an exemplary apparatus.

FIG. 19 is a conceptual data flow diagram 1900 illustrating the data flow between different modules/means/components in an exemplary apparatus 1902. The apparatus may be a UE. The apparatus includes a reception module 1904, a transmission module 1906, a device identifier management module 1908, a connection management module 1910, and a security management module 1912.

According to one aspect of the disclosure, the device identifier management module 1908 receives via the reception module 1904 a request for a device identifier of the UE from at least one of a core network entity 1 1950 or a core network entity 2 1970. In an aspect, the core network entity 1 1950 is an ePDG. The device identifier management module 1908 sends via the transmission module 1906 a response message including the device identifier of the UE to at least one of the core network entity 1 1950 or the core network entity 2 1970, where at least one of the core network entity 1 1950 or the core network entity 2 1970 is configured to determine to maintain, establish, terminate or prevent a connection with the UE through WLAN access based on the device identifier of the UE included in the response message. In an aspect, the device identifier management module 1908 sends the response message using a security association established between the UE and the core network entity 1 1950. In such an aspect, the security association is established via the security management module 1912 during an authentication and tunnel setup procedure between the UE and the core network entity 1 1950.

In one aspect, the core network entity 1 1950 is configured to determine to maintain, establish, terminate or prevent the connection with the UE through the WLAN access by determining whether the device identifier is blacklisted, and disconnecting the UE from the core network upon determining that the device identifier is blacklisted, or maintaining or establishing the connection between the UE and the core network upon determining that the device identifier is not blacklisted. In such an aspect, the core network entity 1 1950 is configured to determine whether the device identifier is blacklisted based on the device identifier received from the UE over the WLAN access. In an aspect, the connection management module 1910 receives a detachment indication from the core network entity 1 1950 indicating to prevent a connection between the UE and the core network entity 1 1950 when the device identifier is blacklisted, and refrains from requesting the connection with the core network upon receiving the detachment indication from the core network entity 1 1950. In an aspect, the device identifier includes at least one of an IMEI of the UE or a WLAN MAC address of the UE.

According to another aspect of the disclosure, the device identifier management module 1908 receives via the reception module 1904 a request for a device identifier of the UE from a core network entity 2 1970. The device identifier management module 1908 sends via the transmission module 1906 a response message including the device identifier of the UE to the core network entity 2 1970. The UE maintains, establishes, terminates or prevents a connection with a core network through WLAN access, where the connection with the core network is maintained unless the UE is disconnected from the core network based on the device identifier of the UE. In an aspect, the core network entity 2 1970 receives the response message including the device identifier from the UE via a cellular access procedure (e.g., LTE access procedure), and the core network entity 1 1950 receives a notification about the device identifier if the device identifier is blacklisted and the core network entity 1 1950 is configured to determine to maintain, establish, terminate or prevent the connection with the UE through the WLAN access based on the notification about the device identifier. In such an aspect, the core network entity 1 1950 is an ePDG. In such an aspect, according to one example, the core network entity 1 1950 is configured to determine to maintain, establish, terminate or prevent the connection with the UE through the WLAN access by determining whether the device identifier is blacklisted based on the notification during an authentication procedure, and causing failure in the authentication procedure to prevent the UE from having a connection through the WLAN access to the core network upon determining that the device identifier is blacklisted, or completing the authentication procedure to establish the connection between the UE and the core network upon determining that the device identifier is not blacklisted. In such an aspect, according to another example, the core network entity 1 1950 is configured to determine to maintain, establish, terminate or prevent the connection with the UE through the WLAN access by determining whether the device identifier is blacklisted based on the notification, and disconnecting the UE from the core network upon determining that the device identifier is blacklisted, or maintaining the connection between the UE and the core network upon determining that the device identifier is not blacklisted.

According to another aspect of the disclosure, the security management module 1912 sends via the transmission module 1906 an authentication request including a device identifier of the UE to the core network entity 1 1950. The security management module 1912 receives via the reception module 1904 an authentication response including an indication that indicates whether the device identifier of the UE is blacklisted. The connection management module 1910 determines to maintain, establish, terminate or prevent a connection with a core network through WLAN access based on the indication. In an aspect, the device identifier includes an IMEI of the UE. In an aspect, the authentication request is sent and the authentication response is received during an authentication procedure to set up a security tunnel between the UE and the core network entity 1 1950. In an aspect, the connection management module 1910 determines to maintain, establish, terminate or prevent the connection with the core network through the WLAN by disconnecting from the core network when the indication indicates that the device identifier of the UE is blacklisted, or maintaining the connection with the core network when the indication indicates that the device identifier is not blacklisted.

The apparatus may include additional modules that perform each of the steps of the algorithm in the aforementioned flow charts of FIGS. 17 and 18. As such, each step in the aforementioned flow charts of FIGS. 17 and 18 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 20:
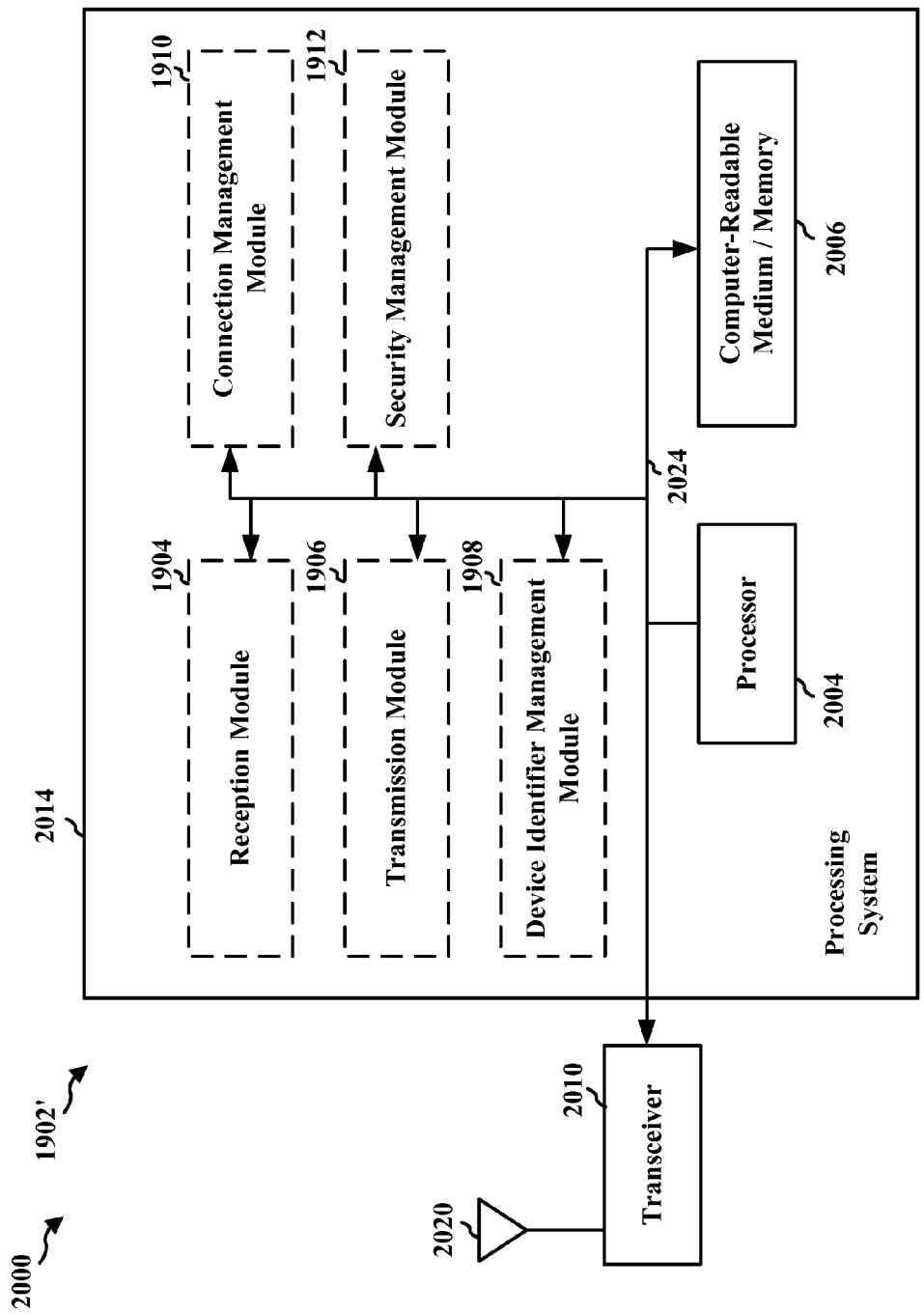
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware modules, represented by the processor 2004, the modules 1904, 1906, 1908, 1910, 1912, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception module 1904. In addition, the transceiver 2010 receives information from the processing system 2014, specifically the transmission module 1906, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system further includes at least one of the modules 1904, 1906, 1908, 1910, and 1912. The modules may be software modules running in the processor 2004, resident/stored in the computer readable medium/ memory 2006, one or more hardware modules coupled to the processor 2004, or some combination thereof. The processing system 2014 may be a component of the UE 650 and may include the memory 660 and/or at least one of the TX processor 668, the RX processor 656, and the controller/ processor 659.

In one configuration, the apparatus 1902/1902' for wireless communication includes means for receiving a request for a device identifier of the UE from at least one of a first core network entity (e.g., core network entity 1 1950) or a second core network entity (e.g., core network entity 2 1970), means for sending a response message including the device identifier of the UE to at least one of the first core network entity or the second core network entity, wherein at least one of the first core network entity or the second core network entity is configured to determine to maintain, establish, terminate or prevent a connection with the UE through WLAN access based on the device identifier of the UE included in the response message. In another configuration, the apparatus 1902/1902' for wireless communication includes means for sending an authentication request including a device identifier of the UE to a core network entity, means for receiving an authentication response including an indication that indicates whether the device identifier of the UE is blacklisted, and means for determining to maintain, establish, terminate or prevent a connection with a core network through WLAN access based on the indication. In an aspect, the apparatus 1902/1902' further includes means for receiving a detachment indication from the core network entity indicating to prevent a connection between the UE and the core network entity when the device identifier is blacklisted, and means for refraining from requesting the connection with the core network upon receiving the detachment indication from the core network entity. The aforementioned means may be one or more of the aforementioned modules of the apparatus 1902 and/or the processing system 2014 of the apparatus 1902' configured to perform the functions recited by the aforementioned means. As described supra, the processing system 2014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a core network entity, comprising:
    by the core network entity, sending a request for a device identifier of a user equipment (UE) to the UE;
    by the core network entity, receiving a response message including the device identifier of the UE from the UE using a security association established between the UE and the core network entity, wherein the security association is established during an authentication and tunnel setup procedure between the UE and the core network entity; and
    by the core network entity, determining to maintain, establish, terminate, or prevent a connection between the UE and the core network through wireless local area network (WLAN) access based on the device identifier of the UE included in the response message.

2. The method of claim 1, wherein the device identifier includes at least one of an international mobile station equipment identity (IMEI) of the UE or a WLAN media access control (MAC) address of the UE.

3. The method of claim 1, wherein the security association is established using a key exchange protocol between the UE and the core network entity.

4. The method of claim 3, wherein the key exchange protocol is an internet key exchange (IKE) protocol or an IKE version 2 (IKEv2) protocol.

5. The method of claim 1, wherein the request is sent and the response message is received during an authentication procedure or after the authentication procedure to set up a security tunnel between the UE and the core network entity.

6. The method of claim 1, wherein determining to maintain, establish, terminate, or prevent the connection between the UE and the core network through the WLAN access comprises:
determining whether the device identifier is blacklisted; and
disconnecting the UE from the core network upon determining that the device identifier is blacklisted, or maintaining the connection between the UE and the core network upon determining that the device identifier is not blacklisted.

7. The method of claim 6, wherein the core network entity determines whether the device identifier is blacklisted based on the device identifier received from the UE over the WLAN access.

8. The method of claim 6, wherein disconnecting the UE from the core network upon determining that the device identifier is blacklisted comprises:
sending a detachment indication to the UE indicating to prevent a connection between the UE and the core network entity upon determining that the device identifier is blacklisted.

9. The method of claim 1, wherein the core network entity is an evolved packet data gateway.

10. A method of wireless communication by a core network entity, comprising:
by the core network entity, receiving a notification about a device identifier of a user equipment (UE) from a second core network entity, wherein the notification about the device identifier is generated based on the device identifier, the device identifier being associated with a cellular access procedure; and
by the core network entity, determining to maintain, establish, terminate, or prevent a connection between the UE and a core network through wireless local area network (WLAN) access based on the notification about the device identifier of the UE.

11. The method of claim 10, wherein the device identifier includes an international mobile station equipment identity (IMEI) of the UE.

12. The method of claim 10, wherein determining to maintain, establish, terminate, or prevent the connection between the UE and the core network through the WLAN access comprises:
determining whether the device identifier is blacklisted based on the notification about the device identifier; and
disconnecting the UE from a core network upon determining that the device identifier is blacklisted, or maintaining the connection between the UE and the core network upon determining that the device identifier is not blacklisted.

13. The method of claim 10, wherein determining to maintain, establish, terminate, or prevent the connection between the UE and a core network through the WLAN access comprises:
determining whether the device identifier is blacklisted based on the notification about the device identifier during an authentication procedure; and
causing failure in the authentication procedure to prevent the UE from having a connection through the WLAN access to a core network upon determining that the device identifier is blacklisted, or completing the authentication procedure to establish the connection between the UE and the core network upon determining that the device identifier is not blacklisted.

14. The method of claim 10, wherein the core network entity is an evolved packet data gateway.

15. A method of wireless communication by a user equipment (UE), comprising:
receiving a request for a device identifier of the UE from at least one of a first core network entity or a second core network entity; and
sending a response message including the device identifier of the UE to at least one of the first core network entity or the second core network entity using a security association established between the UE and the first core network entity, wherein the security association is established during an authentication and tunnel setup procedure between the UE and the first core network entity,
wherein at least one of the first core network entity or the second core network entity is configured to determine to maintain, establish, terminate, or prevent a connection with the UE through wireless local area network (WLAN) access based on the device identifier of the UE included in the response message.

16. The method of claim 15, wherein the device identifier includes at least one of an international mobile station equipment identity (IMEI) of the UE or a WLAN media access control (MAC) address of the UE.

17. The method of claim 15, wherein the security association is established using a key exchange protocol between the UE and the core network entity.

18. The method of claim 17, wherein the key exchange protocol is an internet key exchange (IKE) protocol or an IKE version 2 (IKEv2) protocol.

19. The method of claim 15, wherein the request is received and the response message is sent during an authentication procedure or after the authentication procedure to set up a security tunnel between the UE and the first core network entity.

20. The method of claim 15, wherein the first core network entity is configured to determine to maintain, establish, terminate, or prevent the connection with the UE through the WLAN access by:
determining whether the device identifier is blacklisted; and
disconnecting the UE from the core network upon determining that the device identifier is blacklisted, or maintaining or establishing the connection between the UE and the core network upon determining that the device identifier is not blacklisted.

21. The method of claim 20, wherein the first core network entity is configured to determine whether the device identifier is blacklisted based on the device identifier received from the UE over the WLAN access.

22. The method of claim 15, further comprising:
receiving a detachment indication from the first core network entity indicating to prevent a connection between the UE and the first core network entity when the device identifier is blacklisted; and
refraining from requesting the connection with the core network upon receiving the detachment indication from the first core network entity.

23. The method of claim 15, wherein the second core network entity is configured to receive the response message including the device identifier from the UE via a cellular access procedure, and wherein the first core network entity is configured to receive a notification about the device identifier if the device identifier is blacklisted, and the first core network entity is configured to determine to maintain, establish, terminate, or prevent the connection with the UE through the WLAN access based on the notification about the device identifier.

24. The method of claim 23, wherein the first core network entity is configured to determine to maintain, establish, terminate, or prevent the connection with the UE through the WLAN access by:
  determining whether the device identifier is blacklisted based on the notification; and
  disconnecting the UE from the core network upon determining that the device identifier is blacklisted, or maintaining the connection between the UE and the core network upon determining that the device identifier is not blacklisted.

25. The method of claim 23, wherein the first core network entity is configured to determine to maintain, establish, terminate, or prevent the connection with the UE through the WLAN access by:
  determining whether the device identifier is blacklisted based on the notification during an authentication procedure; and
  causing failure in the authentication procedure to prevent the UE from having a connection through the WLAN access to the core network upon determining that the device identifier is blacklisted, or completing the authentication procedure to establish the connection between the UE and the core network upon determining that the device identifier is not blacklisted.

26. The method of claim 15, wherein the first core network entity is an evolved packet data gateway.

27. The method of claim 15, wherein the second core network entity is a mobility management entity (MME).

28. A core network entity for wireless communication, comprising:
  means for sending, by the core network entity, a request for a device identifier of a user equipment (UE) to the UE;
  means for receiving, by the core network entity, a response message including the device identifier of the UE from the UE using a security association established between the UE and the core network entity, wherein the security association is established during an authentication and tunnel setup procedure between the UE and the core network entity; and
  means for determining, by the core network entity, to maintain, establish, terminate, or prevent a connection between the UE and the core network through wireless local area network (WLAN) access based on the device identifier of the UE included in the response message.

29. The core network entity of claim 28, wherein the device identifier includes at least one of an international mobile station equipment identity (IMEI) of the UE or a WLAN media access control (MAC) address of the UE.

30. The core network entity of claim 28, wherein the security association is established using a key exchange protocol between the UE and the core network entity.

31. The core network entity of claim 30, wherein the key exchange protocol is an internet key exchange (IKE) protocol or an IKE version 2 (IKEv2) protocol.

32. The core network entity of claim 28, wherein the request is sent and the response message is received during an authentication procedure or after the authentication procedure to set up a security tunnel between the UE and the core network entity.

33. The core network entity of claim 28, wherein the means for determining to maintain, establish, terminate, or prevent the connection between the UE and the core network through the WLAN access is configured to:
  determine whether the device identifier is blacklisted; and
  disconnect the UE from a core network upon determining that the device identifier is blacklisted, or maintain the connection between the UE and the core network upon determining that the device identifier is not blacklisted.

34. The core network entity of claim 33, wherein the means for determining to maintain the connection between the UE and the core network through the WLAN access is configured to determine whether the device identifier is blacklisted based on the device identifier received from the UE over the WLAN access.

35. The core network entity of claim 33, wherein the means for determining to maintain the connection between the UE and the core network through the WLAN access is configured to disconnect the UE from the core network by:
  sending a detachment indication to the UE indicating to prevent a connection between the UE and the core network entity upon determining that the device identifier is blacklisted.

36. The core network entity of claim 28, wherein the core network entity is an evolved packet data gateway.

37. A core network entity for wireless communication, comprising
  means for receiving, by the core network entity, a notification about a device identifier of a user equipment (UE) from a second core network entity, wherein the notification about the device identifier is generated based on the device identifier, the device identifier being associated with a cellular access procedure; and
  means for determining, by the core network entity, to maintain, establish, terminate, or prevent a connection between the UE and a core network through wireless local area network (WLAN) access based on the notification about the device identifier of the UE.

38. The core network entity of claim 37, wherein the device identifier includes an international mobile station equipment identity (IMEI) of the UE.

39. The core network entity of claim 37, wherein the means for determining to maintain, establish, terminate, or prevent the connection between the UE and the core network through the WLAN access is configured to:
  determine whether the device identifier is blacklisted based on the notification about the device identifier; and
  disconnect the UE from a core network upon determining that the device identifier is blacklisted, or maintain the connection between the UE and the core network upon determining that the device identifier is not blacklisted.

40. The core network entity of claim 37, wherein the means for determining to maintain, establish, terminate, or prevent the connection between the UE and the core network through the WLAN access is configured to:
  determine whether the device identifier is blacklisted based on the notification about the device identifier during an authentication procedure; and
  cause failure in the authentication procedure to prevent the UE from having a connection through the WLAN access to a core network upon determining that the device identifier is blacklisted, or complete the authentication procedure to establish the connection between the UE and the core network upon determining that the device identifier is not blacklisted.

41. The core network entity of claim 37, wherein the core network entity is an evolved packet data gateway.

42. A user equipment (UE) for wireless communication, comprising:
   means for receiving a request for a device identifier of the UE from at least one of a first core network entity or a second core network entity;
   means for sending a response message including the device identifier of the UE to at least one of the first core network entity or the second core network entity using a security association established between the UE and the first core network entity, wherein the security association is established during an authentication and tunnel setup procedure between the UE and the first core network entity,
   wherein at least one of the first core network entity or the second core network entity is configured to determine to maintain, establish, terminate, or prevent a connection between the UE and the core network through wireless local area network (WLAN) access based on the device identifier of the UE included in the response message.

43. The UE of claim 42, wherein the device identifier includes at least one of an international mobile station equipment identity (IMEI) of the UE or a WLAN media access control (MAC) address of the UE.

44. The UE of claim 42, wherein the security association is established using a key exchange protocol between the UE and the core network entity.

45. The UE of claim 44, wherein the key exchange protocol is an internet key exchange (IKE) protocol or an IKE version 2 (IKEv2) protocol.

46. The UE of claim 42, wherein the request is received and the response message is sent during an authentication procedure or after the authentication procedure to set up a security tunnel between the UE and the first core network entity.

47. The UE of claim 42, wherein the first core network entity is configured to determine to maintain, establish, terminate, or prevent the connection with the UE through the WLAN access by:
   determining whether the device identifier is blacklisted; and
   disconnecting the UE from the core network upon determining that the device identifier is blacklisted, or maintaining the connection between the UE and the core network upon determining that the device identifier is not blacklisted.

48. The UE of claim 47, wherein the first core network entity is configured to determine whether the device identifier is blacklisted based on the device identifier received from the UE over the WLAN access.

49. The UE of claim 42, further comprising:
   means for receiving a detachment indication from the first core network entity indicating to prevent a connection between the UE and the first core network entity when the device identifier is blacklisted; and
   means for refraining from requesting the connection with the core network upon receiving the detachment indication from the first core network entity.

50. The UE of claim 42, wherein the second core network entity is configured to receive the response message including the device identifier from the UE via a cellular access procedure, and wherein the first core network entity is configured to receive a notification about the device identifier if the device identifier is blacklisted, and first the core network entity is configured to determine to maintain, establish, terminate, or prevent the connection with the UE through the WLAN access based on the notification about the device identifier.

51. The UE of claim 50, wherein the first core network entity is configured to determine to maintain, establish, terminate, or prevent the connection with the UE through the WLAN access by:
   determining whether the device identifier is blacklisted based on the notification; and
   disconnecting the UE from the core network upon determining that the device identifier is blacklisted, or maintaining the connection between the UE and the core network upon determining that the device identifier is not blacklisted.

52. The UE of claim 50, wherein the first core network entity is configured to determine to maintain, establish, terminate, or prevent the connection with the UE through the WLAN access by:
   determining whether the device identifier is blacklisted based on the notification during an authentication procedure; and
   causing failure in the authentication procedure to prevent the UE from having a connection through the WLAN access to the core network upon determining that the device identifier is blacklisted, or completing the authentication procedure to establish the connection between the UE and the core network upon determining that the device identifier is not blacklisted.

53. The UE of claim 42, wherein the first core network entity is an evolved packet data gateway.

54. The UE of claim 42, wherein the second core network entity is a mobility management entity (MME).

55. A core network entity for wireless communication, comprising:
   a memory; and
   at least one processor coupled to the memory and configured to:
      send, by the core network entity, a request for a device identifier of a user equipment (UE) to the UE;
      receive, by the core network entity, a response message including the device identifier of the UE from the UE using a security association established between the UE and the core network entity, wherein the security association is established during an authentication and tunnel setup procedure between the UE and the core network entity; and
      determine, by the core network entity, to maintain, establish, terminate, or prevent a connection between the UE and the core network through wireless local area network (WLAN) access based on the device identifier of the UE included in the response message.

56. The core network entity of claim 55, wherein the device identifier includes at least one of an international mobile station equipment identity (IMEI) of the UE or a WLAN media access control (MAC) address of the UE.

57. The core network entity of claim 55, wherein the security association is established using a key exchange protocol between the UE and the core network entity.

58. The core network entity of claim 57, wherein the key exchange protocol is an internet key exchange (IKE) protocol or an IKE version 2 (IKEv2) protocol.

59. The core network entity of claim 55, wherein the request is sent and the response message is received during an authentication procedure or after the authentication procedure to set up a security tunnel between the UE and the core network entity.

60. The core network entity of claim 55, wherein the at least one processor configured to determine to maintain, establish, terminate, or prevent the connection between the UE and the core network through the WLAN access is configured to:
 determine whether the device identifier is blacklisted; and
 disconnect the UE from a core network upon determining that the device identifier is blacklisted, or maintain the connection between the UE and the core network upon determining that the device identifier is not blacklisted.

61. The core network entity of claim 60, wherein the at least one processor determines whether the device identifier is blacklisted based on the device identifier received from the UE over the WLAN access.

62. The core network entity of claim 60, wherein the at least one processor configured to disconnect the UE from the core network upon determining that the device identifier is blacklisted is configured to:
 send a detachment indication to the UE indicating to prevent a connection between the UE and the core network entity upon determining that the device identifier is blacklisted.

63. The core network entity of claim 55, wherein the core network entity is an evolved packet data gateway.

64. A core network entity for wireless communication, comprising
 a memory; and
 at least one processor coupled to the memory and configured to:
  receive, by the core network entity, a notification about a device identifier of a user equipment (UE) from a second core network entity, wherein the notification about the device identifier is generated based on device identifier, the device identifier being associated with a cellular access procedure; and
  determine, by the core network entity, to maintain, establish, terminate, or prevent a connection between the UE and the core network through wireless local area network (WLAN) access based on the notification about the device identifier of the UE.

65. The core network entity of claim 64, wherein the device identifier includes an international mobile station equipment identity (IMEI) of the UE.

66. The core network entity of claim 64, wherein the at least one processor configured to determine to maintain, establish, terminate, or prevent the connection between the UE and the core network through the WLAN access is configured to:
 determine whether the device identifier is blacklisted based on the notification about the device identifier; and
 disconnect the UE from a core network upon determining that the device identifier is blacklisted, or maintain the connection between the UE and the core network upon determining that the device identifier is not blacklisted.

67. The core network entity of claim 64, the at least one processor configured to determine to maintain, establish, terminate, or prevent the connection between the UE and the core network through the WLAN access is configured to:
 determine whether the device identifier is blacklisted based on the notification about the device identifier during an authentication procedure; and
 cause failure in the authentication procedure to prevent the UE from having a connection through the WLAN access to a core network upon determining that the device identifier is blacklisted, or complete the authentication procedure to establish the connection between the UE and the core network upon determining that the device identifier is not blacklisted.

68. The core network entity of claim 64, wherein the core network entity is an evolved packet data gateway.

69. A user equipment (UE) for wireless communication, comprising:
 a memory; and
 at least one processor coupled to the memory and configured to:
  receive a request for a device identifier of the UE from at least one of a first core network entity or a second core network entity;
  send a response message including the device identifier of the UE to at least one of the first core network entity or the second core network entity using a security association established between the UE and the first core network entity, wherein the security association is established during an authentication and tunnel setup procedure between the UE and the first core network entity,
  wherein at least one of the first core network entity or the second core network entity is configured to determine to maintain, establish, terminate, or prevent a connection between the UE and the core network through wireless local area network (WLAN) access based on the device identifier of the UE included in the response message.

70. The UE of claim 69, wherein the device identifier includes at least one of an international mobile station equipment identity (IMEI) of the UE or a WLAN media access control (MAC) address of the UE.

71. The UE of claim 69, wherein the security association is established using a key exchange protocol between the UE and the core network entity.

72. The UE of claim 71, wherein the key exchange protocol is an internet key exchange (IKE) protocol or an IKE version 2 (IKEv2) protocol.

73. The UE of claim 69, wherein the request is received and the response message is sent during an authentication procedure or after the authentication procedure to set up a security tunnel between the UE and the first core network entity.

74. The UE of claim 69, wherein the first core network entity is configured to determine to maintain, establish, terminate, or prevent the connection with the UE through the WLAN access by:
 determining whether the device identifier is blacklisted; and
 disconnecting the UE from the core network upon determining that the device identifier is blacklisted, or maintaining the connection between the UE and the core network upon determining that the device identifier is not blacklisted.

75. The UE of claim 74, wherein the first core network entity is configured to determine whether the device identifier is blacklisted based on the device identifier received from the UE over the WLAN access.

76. The UE of claim 69, wherein the at least one processor is further configured to:
 receive a detachment indication from the first core network entity indicating to prevent a connection between the UE and the first core network entity when the device identifier is blacklisted; and refrain from requesting the connection between the UE and the core network upon receiving the detachment indication from the first core network entity.

77. The UE of claim 69, wherein the second core network entity is configured to receive the response message including the device identifier from the UE via a cellular access procedure, and wherein the first core network entity is configured to receive a notification about the device identifier if the device identifier is blacklisted, and the first core network entity is configured to determine to maintain, establish, terminate, or prevent the connection with the UE through the WLAN access based on the notification about the device identifier.

78. The UE of claim 77, wherein the first core network entity is configured to determine to maintain, establish, terminate, or prevent the connection with the UE through the WLAN access by:

determining whether the device identifier is blacklisted based on the notification; and disconnecting the UE from the core network upon determining that the device identifier is blacklisted, or maintaining the connection between the UE and the core network upon determining that the device identifier is not blacklisted.

79. The UE of claim 77, wherein the first core network entity is configured to determine to maintain, establish, terminate, or prevent the connection with the UE through the WLAN access by:

determining whether the device identifier is blacklisted based on the notification during an authentication procedure; and causing failure in the authentication procedure to prevent the UE from having a connection through the WLAN access to the core network upon determining that the device identifier is blacklisted, or completing the authentication procedure to establish the connection between the UE and the core network upon determining that the device identifier is not blacklisted.

80. The UE of claim 69, wherein the first core network entity is an evolved packet data gateway.

81. The UE of claim 69, wherein the second core network entity is a mobility management entity (MME).

82. A non-transitory, computer-readable medium storing computer executable code for wireless communication for a core network entity, comprising code to:

send, by the core network entity, a request for a device identifier of a user equipment (UE) to the UE;

receive, by the core network entity, a response message including the device identifier of the UE from the UE using a security association established between the UE and the core network entity, wherein the security association is established during an authentication and tunnel setup procedure between the UE and the core network entity; and determine, by the core network entity, to maintain, establish, terminate, or prevent a connection between the UE and a core network through wireless local area network (WLAN) access based on the device identifier of the UE included in the response message.

83. A non-transitory, computer-readable medium storing computer executable code for wireless communication for a core network entity, comprising code to:

receive, by the core network entity, a notification about a device identifier of a user equipment (UE) from a second core network entity, wherein the notification about the device identifier is generated based on the device identifier, the device identifier being associated with a cellular access procedure; and determine, by the core network entity, to maintain, establish, terminate, or prevent a connection between the UE and a core network through wireless local area network (WLAN) access based on the notification about the device identifier of the UE.

84. A non-transitory, computer-readable medium storing computer executable code for wireless communication for a user equipment (UE), comprising code to:

receive a request for a device identifier of the UE from at least one of a first core network entity or a second core network entity;

send a response message including the device identifier of the UE to at least one of the first core network entity or the second core network entity using a security association established between the UE and the first core network entity, wherein the security association is established during an authentication and tunnel setup procedure between the UE and the first core network entity, wherein at least one of the first core network entity or the second core network entity is configured to determine to maintain, establish, terminate, or prevent a connection between the UE and a core network through wireless local area network (WLAN) access based on the device identifier of the UE included in the response message.

* * * * *